(12) United States Patent
Jin et al.

(10) Patent No.: US 11,239,775 B1
(45) Date of Patent: Feb. 1, 2022

(54) SEPARATELY EXCITED DIRECT CURRENT MOTOR DRIVE APPARATUS AND EQUIPMENT

(71) Applicant: UNIVERSITY OF SHANGHAI FOR SCIENCE AND TECHNOLOGY, Shanghai (CN)

(72) Inventors: Aijuan Jin, Shanghai (CN); Shaolong Li, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 0 days.

(21) Appl. No.: 17/296,239

(22) PCT Filed: Dec. 27, 2019

(86) PCT No.: PCT/CN2019/129074
§ 371 (c)(1),
(2) Date: May 23, 2021

(87) PCT Pub. No.: WO2020/135688
PCT Pub. Date: Jul. 2, 2020

(30) Foreign Application Priority Data

Dec. 29, 2018 (CN) .......................... 201811653621.4
Dec. 29, 2018 (CN) .......................... 201811654334.5
(Continued)

(51) Int. Cl.
*H02P 7/10* (2006.01)
(52) U.S. Cl.
CPC ...................... *H02P 7/10* (2013.01)
(58) Field of Classification Search
CPC ...... H02P 1/04; H02P 1/12; H02P 1/16; H02P 1/18; H02P 1/24; H02P 1/26; H02P 1/265;
(Continued)

(56) References Cited

U.S. PATENT DOCUMENTS 4,284,936 A * 8/1981 Bailey ....................... H02P 3/08
318/381

FOREIGN PATENT DOCUMENTS

CN 201113730 Y 9/2008
CN 102158151 A 8/2011
(Continued)

OTHER PUBLICATIONS

International Search Report in PCT/CN2019/129074, issued by ISA, dated Mar. 26, 2020.
(Continued)

*Primary Examiner* — Antony M Paul
(74) *Attorney, Agent, or Firm* — Zhu Lehnhoff LLP

(57) ABSTRACT

The invention provides a separately excited direct current motor drive apparatus and electric equipment. The separately excited direct current motor drive apparatus includes: a separately excited direct current motor; a direct current power supply; an armature chopper; and a field chopper, wherein the armature chopper has m armature chopper units, each armature chopper unit has a pair of armature power output terminals and w armature switch control ends, the field chopper has n field chopper units, each field chopper unit has a pair of field power output terminals, the separately excited direct current motor has m pairs of armature external terminals and n pairs of field external terminals, the m pairs of armature external terminals are connected to the m pairs of armature power output terminals in a one-to-one correspondence manner, the n pairs of field external terminals are connected to the n pairs of field power output terminals in a one-to-one correspondence manner, m is a positive integer not less than 2, n is a positive integer not less than 2, and w is 1, 2 or 4.

20 Claims, 13 Drawing Sheets

(30) Foreign Application Priority Data

Dec. 29, 2018 (CN) .......................... 201811654482.7
Dec. 29, 2018 (CN) .......................... 201811654527.0
Dec. 29, 2018 (CN) .......................... 201811654534.0
Dec. 29, 2018 (CN) .......................... 201811654539.3

(58) Field of Classification Search
 CPC .... H02P 1/42; H02P 1/46; H02P 1/465; H02P 1/54; H02P 3/00; H02P 4/00; H02P 5/00; H02P 6/00; H02P 6/005; H02P 6/04; H02P 6/085; H02P 6/10; H02P 6/12; H02P 6/14; H02P 6/28; H02P 7/00; H02P 7/282; H02P 7/285; H02P 7/293; H02P 7/298; H02P 7/30; H02P 7/32; H02P 7/343; H02P 7/347; H02P 9/14; H02P 9/305; H02P 9/36; H02P 9/38; H02P 9/44; H02P 11/06; H02P 21/00; H02P 21/08; H02P 21/10; H02P 21/22; H02P 21/50; H02P 23/00; H02P 23/28; H02P 25/00; H02P 25/024; H02P 25/062; H02P 25/188; H02P 27/04; H02P 27/06; H02P 29/662

See application file for complete search history.

(56) References Cited

FOREIGN PATENT DOCUMENTS

| | | |
|---|---|---|
| CN | 206878735 U | 1/2018 |
| EP | 0913291 A2 | 5/1999 |
| JP | 2001253650 A | 9/2001 |

OTHER PUBLICATIONS

Written Opinion of the International Search Report in PCT/CN2019/129074, issued by ISA, dated Mar. 26, 2020.

* cited by examiner

SEPARATELY EXCITED DIRECT CURRENT MOTOR DRIVE APPARATUS AND EQUIPMENT

TECHNICAL FIELD

The present invention belongs to the field of direct current motors, and particularly relates to a separately excited direct current motor drive apparatus and electric equipment including the separately excited direct current motor drive apparatus.

BACKGROUND

A field winding and an armature winding of a separately excited direct current motor are powered by two power supplies respectively, and the field current is provided separately and is unrelated to the armature current. Therefore, the separately excited direct current motor is convenient to control and prone to speed regulation, forward and reverse rotation and energy feedback, and has been widely applied in electric forklifts, electric vehicles, electric sightseeing vehicles, electric tractors, large-scale machine tool spindle drive systems and ships.

As shown in FIG. 6, the conventional separately excited direct current motor drive apparatus 200 is composed of a separately excited direct current motor, an armature chopper, and a field chopper. External terminals of the separately excited direct current motor include only a pair of armature external terminals and a pair of field external terminals, the pair of armature external terminals are electrically connected to a pair of armature power output terminals of the armature chopper, and the pair of field external terminals are electrically connected to a pair of field power output terminals of the field chopper. In order to ensure system reliability, the maximum output current of the chopper is generally 2 to 3 times the rated current of the motor. A high-power and high-performance direct current motor, especially a low-voltage and high-current direct current motor, requires a chopper with high continuous working current. However, a switching device in relevant chopper is expensive, and the maximum output current value of the commercially available chopper for the high-performance motor is less than one thousand amperes. These severely restrict and affect the development of the low-voltage and high-current direct current motor.

The chopper controls the on and off of a power switch tube by means of pulse width modulation technology to change the output voltage and output current, the size of an output current ripple is directly proportional to the sizes of a motor output torque ripple and a speed ripple and inversely proportional to the switching frequency of the power switch tube, and the size of the switching frequency of the power switch tube is directly proportional to the switching loss (or temperature rise, failure rate). Therefore, in order to reduce the ripples of the output current, torque and speed of the motor, the switching frequency has to be increased. However, in order to reduce the switching loss of the power switch tube, the switching frequency has to be reduced. This contradiction affects the development of the separately excited direct current motor drive apparatus, resulting in difficult application in apparatuses such as numerically controlled machine tools that have high requirements for speed and torque ripples. For example, a separately excited direct current motor used in national defense equipment has to greatly reduce its own vibration and noise due to the need for stealth, that is, the requirements for output torque ripples and current ripples of the separately excited direct current motor are especially strict. At present, the conventional separately excited direct current motors used in high-power national defense electric equipment can no longer cope with the increasingly developed detection technology.

Based on the above reasons, the development of the separately excited direct current motor drive apparatus has been restricted and affected, which in turn affects the development of electric equipment, such as electric vehicles, electric ships, electric aircraft, and even electric combat vehicles, electric warships, electric aircraft and electrically driven aircraft carriers in national defense.

SUMMARY OF THE INVENTION

The present invention is intended to solve the above problems, and aims to provide a separately excited direct current motor drive apparatus and electric equipment including the separately excited direct current motor drive apparatus.

In order to achieve the above purpose, the present invention adopts the following technical solutions:

<First Structure>

The present invention provides a separately excited direct current motor drive apparatus, characterized by including: a separately excited direct current motor with a rated voltage; a direct current power supply with a constant voltage corresponding to the rated voltage; an armature chopper for converting the constant voltage into an armature variable voltage based on an armature control signal and providing the armature variable voltage to the separately excited direct current motor; and a field chopper for converting the constant voltage into a field variable voltage based on a field control signal and providing the field variable voltage to the separately excited direct current motor, wherein the armature chopper has m armature chopper units, each armature chopper unit has a first armature power output end, a second armature power output end and w armature switch control ends, the armature control signal includes m armature unit control signals respectively corresponding to the m armature chopper units and formed according to a predetermined phase staggering rule, each armature unit control signal includes w armature switch control signals corresponding to the w armature switch control ends in the corresponding armature chopper unit, the w armature switch control ends are used to correspondingly receive the w armature switch control signals, the m first armature power output ends of all the armature chopper units and the m second armature power output ends of all the armature chopper units correspondingly form m pairs of armature power output terminals, the field chopper has n field chopper units, each field chopper unit includes a first field bridge arm and a second field bridge arm, as well as a first field power output end and a second field power output end, the first field bridge arm includes a first field upper bridge arm and a first field lower bridge connected in series with each other, the second field bridge arm includes a second field upper bridge arm and a second field lower bridge arm connected in series with each other, the first field bridge arm and the second field bridge arm are connected in parallel to each other, the first field upper bridge arm and the second field upper bridge arm are both connected to a positive pole of the field direct current power supply, the first field lower bridge arm and the second field lower bridge arm are both connected to a negative pole of the field direct current power supply, the first field upper bridge arm, the first field lower bridge arm, the second field upper bridge arm and the second field lower bridge arm respectively include at least one field power switch tube, at least one diode connected in anti-parallel to the field power switch tube, and a field switch control end, each field power switch tube has one field control pole, the field switch control end is formed based on the field control pole, the field control signal includes n field unit control signals respectively corresponding to the n field chopper units and formed according to a field predetermined phase staggering rule, each field unit control signal includes four field switch control signals corresponding to the four field switch control ends in the corresponding field chopper unit, the field switch control end in the first field upper bridge arm is used as a first field upper bridge arm switch control end, the field switch control end in the first field lower bridge arm is used as a first field lower bridge arm switch control end, the field switch control end in the second field upper bridge arm is used as a second field upper bridge arm switch control end, and the field switch control end in the second field lower bridge arm is used as a second field lower bridge arm switch control end, for correspondingly receiving the four field switch control signals, the first field power output end is arranged between the first field upper bridge arm and the first field lower bridge arm, the second field power output end is arranged between the second field upper bridge arm and the second field lower bridge arm, the n first field power output ends of all the field chopper units and the n second field power output ends of all the field chopper units correspondingly form n pairs of field power output terminals, the separately excited direct current motor includes: m pairs of brushes; a stator including m pairs of main magnetic poles corresponding to the m pairs of brushes and one field winding portion; and a rotor, arranged in the stator, including a plurality of armature windings connected with one another in a predetermined connection manner, wherein each pair of main magnetic poles includes an S-polarity main magnetic pole and an N-polarity main magnetic pole, each pair of brushes includes an S-pole corresponding brush corresponding to the S-polarity main magnetic pole and an N-pole corresponding brush corresponding to the N-polarity main magnetic pole, the field winding portion includes n field winding units, each field winding unit is formed by field coils made from an insulated conductor bar composed of metal wires wrapped with an insulating layer on at least one pair of main magnetic poles, the insulated conductor bar in each field winding unit has one end and the other end, two leading-out ends of each pair of brushes respectively form a first armature terminal and a second armature terminal, the m first armature terminals and the m second armature terminals of all the brushes correspondingly form m pairs of armature external terminals, the m pairs of armature external terminals are connected to the m pairs of armature power output terminals in a one-to-one correspondence manner, the n one ends of all the insulated conductor bars form n first field terminals, the n other ends of all the insulated conductor bars form n second field terminals, the n first field terminals and the n second field terminals correspondingly form n pairs of field external terminals, the n pairs of field external terminals are connected to the n pairs of field power output terminals in a one-to-one correspondence manner, m is a positive integer not less than 2, n is a positive integer not less than 2, and w is 1, 2 or 4.

The separately excited direct current motor drive apparatus provided by the present invention may also have such characteristics: wherein w is 1, each armature chopper unit includes an armature upper bridge arm and an armature lower bridge arm, as well as a first armature power output end and a second armature power output end, the armature upper bridge arm and the armature lower bridge arm are connected in series with each other, the armature upper bridge arm is connected to the positive pole of the direct current power supply, the armature lower bridge arm is connected to the negative pole of the direct current power supply, the armature upper bridge arm includes at least one armature power switch tube and an armature switch control end, each armature power switch tube has one armature control pole, the armature switch control end is formed based on the armature control pole, the armature control signal includes m armature switch control signals respectively corresponding to the in armature chopper units and formed according to an armature predetermined phase staggering rule, the armature switch control end is used to correspondingly receive the armature switch control signals, the armature lower bridge arm includes at least one diode, the first armature power output end is arranged between the armature upper bridge arm and the armature lower bridge arm, and the second armature power output end is arranged at an end, connected to the armature direct current power supply, of the armature lower bridge arm.

The separately excited direct current motor drive apparatus provided by the present invention may also have such characteristics: wherein the armature predetermined phase staggering rule is that phases of the m armature switch control signals are sequentially staggered by one m-th of a switching period; or, m is an even number, and the predetermined phase staggering rule is that the phases of the m armature switch control signals are sequentially staggered by two (m-th)s of a switching period.

The separately excited direct current motor drive apparatus provided by the present invention may also have such characteristics: wherein w is 2, each armature chopper unit includes an armature upper bridge arm and an armature lower bridge arm, as well as a first armature power output end and a second armature power output end, the armature upper bridge arm and the armature lower bridge arm are connected in series with each other, the armature upper bridge arm is connected to the positive pole of the armature direct current power supply, the armature lower bridge arm is connected to the negative pole of the armature direct current power supply, the armature upper bridge atm and the armature lower bridge arm respectively include at least one armature power switch tube, at least one diode connected in anti-parallel to the armature power switch tube, and an armature switch control end, each armature power switch tube has one armature control pole, the armature switch control end is formed based on the armature control pole, the armature control signal includes m armature unit control signals respectively corresponding to the m armature chopper units and formed according to an armature predetermined phase staggering rule, each armature unit control signal includes two armature switch control signals corresponding to the two armature switch control ends in the corresponding armature chopper unit, the armature switch control end in the armature upper bridge arm is used as an armature upper bridge arm switch control end, the armature switch control end in the armature lower bridge arm is used as an armature lower bridge arm switch control end, for correspondingly receiving the two armature switch control signals, the first armature power output end is arranged between the armature upper bridge arm and the armature lower bridge arm, and the second armature power output end is arranged at an end, connected to the armature direct current power supply, of the armature lower bridge arm.

The separately excited direct current motor drive apparatus provided by the present invention may also have such characteristics: wherein in each armature chopper unit, the armature switch control signal corresponding to the armature upper bridge arm switch control end is set as an armature reference switch control signal, a phase of the armature reference switch control signal is determined according to the armature predetermined phase corresponding to the armature unit control signal, the armature switch control signal corresponding to the armature lower bridge arm switch control end is reciprocal to the armature reference switch control signal, the armature predetermined phase staggering rule is that m phases respectively corresponding to the m armature unit control signals and used as m armature predetermined phases are sequentially staggered by one m-th of a switching period; or, m is an even number, and the armature predetermined phase staggering rule is that the m phases respectively corresponding to the m armature unit control signals and used as the m armature predetermined phases are sequentially staggered by two (m-th)s of a switching period.

The separately excited direct current motor drive apparatus provided by the present invention may also have such characteristics: wherein w is 4, each armature chopper unit includes a first armature bridge arm and a second armature bridge arm, as well as a first armature power output end and a second armature power output end, the first armature bridge aim includes a first armature upper bridge aim and a first armature lower bridge arm connected in series with each other, the second armature bridge arm includes a second armature upper bridge arm and a second armature lower bridge aim connected in series with each other, the first armature bridge arm and the second armature bridge arm are connected in parallel to each other, the first armature upper bridge arm and the second armature upper bridge arm are both connected to the positive pole of the armature direct current power supply, the first armature lower bridge arm and the second armature lower bridge arm are both connected to the negative pole of the armature direct current power supply, the first armature upper bridge arm, the first armature lower bridge aim, the second armature upper bridge aim and the second armature lower bridge arm respectively include at least one armature power switch tube, at least one diode connected in anti-parallel to the armature power switch tube, and an armature switch control end, each armature power switch tube has one armature control pole, the armature switch control end is formed based on the armature control pole, the armature control signal includes m armature unit control signals respectively corresponding to the m armature chopper units and formed according to an armature predetermined phase staggering rule, each armature unit control signal includes four armature switch control signals corresponding to the four armature switch control ends in the corresponding armature chopper unit, the armature switch control end in the first armature upper bridge arm is used as a first armature upper bridge arm switch control end, the armature switch control end in the first armature lower bridge arm is used as a first armature lower bridge arm switch control end, the armature switch control end in the second armature upper bridge arm is used as a second armature upper bridge arm switch control end, and the armature switch control end in the second armature lower bridge arm is used as a second armature lower bridge arm switch control end, for correspondingly receiving the four armature switch control signals, the first armature power output end is arranged between the first armature upper bridge aim and the first armature lower bridge arm, and the second armature power output end is arranged between the second armature upper bridge arm and the second armature lower bridge aim.

The separately excited direct current motor drive apparatus provided by the present invention may also have such characteristics: wherein in each armature chopper unit, the two armature switch control signals corresponding to the first armature upper bridge arm switch control end and the second armature lower bridge arm are set as armature reference switch control signals, phases of the armature reference switch control signals are determined according to the armature predetermined phase corresponding to the armature unit control signal, the armature switch control signals corresponding to the first armature lower bridge arm switch control end and the second armature upper bridge arm switch control end are reciprocal to the armature reference switch control signals, the armature predetermined phase staggering rule is that m phases respectively corresponding to the m armature unit control signals and used as m armature predetermined phases are sequentially staggered by one m-th of a switching period; or, m is an even number, and the armature predetermined phase staggering rule is that the m phases respectively corresponding to the m armature unit control signals and used as the m armature predetermined phases are sequentially staggered by two (m-th)s of a switching period.

The separately excited direct current motor drive apparatus provided by the present invention may also have such characteristics: wherein in each field chopper unit, the two field switch control signals corresponding to the first field upper bridge arm switch control end and the second field lower bridge arm are set as field reference switch control signals, phases of the field reference switch control signals are determined according to the field predetermined phase corresponding to the field unit control signal, the field switch control signals corresponding to the first field lower bridge arm switch control end and the second field upper bridge arm switch control end are reciprocal to the field reference switch control signals, the field predetermined phase staggering rule is that n phases respectively corresponding to the n field unit control signals and used as n field predetermined phases are sequentially staggered by one n-th of a switching period; or, n is an even number, and the field predetermined phase staggering rule is that the n phases respectively corresponding to the n field unit control signals and used as the n field predetermined phases are sequentially staggered by two (n-th)s of a switching period.

The separately excited direct current motor drive apparatus provided by the present invention may also have such characteristics: wherein m=n,
the n field winding units correspond to the m pairs of main magnetic poles respectively, and the insulated conductor bar in each field winding unit is formed on the corresponding pair of main magnetic poles.

The separately excited direct current motor drive apparatus provided by the present invention may also have such characteristics: wherein the number of turns of the field coils on each main magnetic pole is the same, each pair of main magnetic poles corresponds to the spatial position of the corresponding pair of brushes, in each field winding unit, the connection relationship of the two field coils is any one of series and parallel, and the connection relationship of the two field coils in each field winding unit is the same.

The separately excited direct current motor drive apparatus provided by the present invention may also have such characteristic: wherein the insulated conductor bar in each field winding unit is formed on the m pairs of main magnetic poles.

The separately excited direct current motor drive apparatus provided by the present invention may also have such characteristics: wherein the winding direction and the number of turns of the n field coils on each main magnetic pole are the same, in each field winding unit, the connection relationship of the 2m field coils is any one of series, parallel and series-parallel, and the connection relationship of the 2m field coils in each field winding unit is the same.

The separately excited direct current motor drive apparatus provided by the present invention may also have such characteristic: wherein the predetermined connection manner is any one of single stack, cascade and complex wave.

<Second Structure>

The present invention further provides electric equipment, characterized by including: a separately excited direct current motor drive apparatus, wherein the separately excited direct current motor drive apparatus is the separately excited direct current motor drive apparatus of <Structure 1>.

The electric equipment provided by the present invention may also have such characteristics: wherein the electric equipment is any one of an electric forklift, an electric automobile, an electric sightseeing vehicle, an electric tractor, a large-scale machine tool spindle drive system and a ship.

Functions and Effects of the Present Invention

According to the separately excited direct current motor drive apparatus and the electric equipment including the separately excited direct current motor drive apparatus of the present invention, the armature chopper has m armature chopper units, each armature chopper unit has a first armature power output end, a second armature power output end and w armature switch control ends, the armature control signal includes m armature unit control signals respectively corresponding to the m armature chopper units and formed according to a predetermined phase staggering rule, each armature unit control signal includes w armature switch control signals corresponding to the w armature switch control ends in the corresponding armature chopper unit, the w armature switch control ends are used to correspondingly receive the w armature switch control signals, the m first armature power output ends of all the armature chopper units and the m second armature power output ends of all the m armature chopper units correspondingly form m pairs of armature power output terminals, the field chopper has n field chopper units, each field chopper unit includes a first field bridge arm and a second field bridge arm, as well as a first field power output end and a second field power output end, the first field bridge arm includes a first field upper bridge arm and a first field lower bridge connected in series with each other, the second field bridge arm includes a second field upper bridge arm and a second field lower bridge arm connected in series with each other, the first field bridge arm and the second field bridge arm are connected in parallel to each other, the first field upper bridge arm and the second field upper bridge arm are both connected to a positive pole of the field direct current power supply, the first field lower bridge arm and the second field lower bridge arm are both connected to a negative pole of the field direct current power supply, the first field upper bridge arm, the first field lower bridge arm, the second field upper bridge arm and the second field lower bridge arm respectively include at least one field power switch tube, at least one diode connected in anti-parallel to the field power switch tube, and a field switch control end, each field power switch tube has one field control pole, the field switch control end is formed based on the field control pole, the field control signal includes n field unit control signals respectively corresponding to the n field chopper units and formed according to a field predetermined phase staggering rule, each field unit control signal includes four field switch control signals corresponding to the four field switch control ends in the corresponding field chopper unit, the field switch control end in the first field upper bridge arm is used as a first field upper bridge arm switch control end, the field switch control end in the first field lower bridge arm is used as a first field lower bridge arm switch control end, the field switch control end in the second field upper bridge arm is used as a second field upper bridge arm switch control end, and the field switch control end in the second field lower bridge arm is used as a second field lower bridge arm switch control end, for correspondingly receiving the four field switch control signals, the first field power output end is arranged between the first field upper bridge arm and the first field lower bridge arm, the second field power output end is arranged between the second field upper bridge arm and the second field lower bridge arm, the n first field power output ends of all the field chopper units and the n second field power output ends of all the field chopper units correspondingly form n pairs of field power output terminals, the separately excited direct current motor includes: m pairs of brushes; a stator including m pairs of main magnetic poles corresponding to the m pairs of brushes and one field winding portion; and a rotor, arranged in the stator and including a plurality of armature windings connected with one another in a predetermined connection manner, wherein each pair of main magnetic poles includes an S-polarity main magnetic pole and an N-polarity main magnetic pole, each pair of brushes includes an S-pole corresponding brush corresponding to the S-polarity main magnetic pole and an N-pole corresponding brush corresponding to the N-polarity main magnetic pole, the field winding portion includes n field winding units, each field winding unit is formed by field coils made from an insulated conductor bar composed of metal wires wrapped with an insulating layer on at least one pair of main magnetic poles, the insulated conductor bar in each field winding unit has one end and the other end, two leading-out ends of each pair of brushes respectively form a first armature terminal and a second armature terminal, the m first armature terminals and the m second armature terminals of all the brushes correspondingly form m pairs of armature external terminals, the m pairs of armature external terminals are connected to the m pairs of armature power output terminals in a one-to-one correspondence manner, the n one ends of all the insulated conductor bars form n first field terminals, the n other ends of all the insulated conductor bars form n second field terminals, the n first field terminals and the n second field terminals correspondingly form n pairs of field external terminals, the n pairs of field external terminals are connected to the n pairs of field power output terminals in a one-to-one correspondence manner, m is a positive integer not less than 2, n is a positive integer not less than 2, w is 1, 2 or 4, that is, each pair of armature external terminals is connected to a pair of brushes, and each pair of field external terminals is connected to one field winding unit. Therefore, on the one hand, an armature branch formed by each pair of brushes is independent from a field branch formed by each field winding unit, the armature branches and the field branches are independent of one another, the current of each branch is also independent, and each branch can work independently and is powered by the corresponding pair of power output terminals, that is:

each pair of armature power output terminals only needs to bear the working current of one armature branch, which is only one m-th of the armature rated input current; and each pair of field power output terminals only bears the working current of one field branch, which is only one n-th of the field rated input current. For a motor with high rated input current, as long as m and n are large enough, the working current of each branch or the output current of each pair of power output terminals will be correspondingly decreased to reduce the power requirement of each chopper unit. Therefore, an ordinary power switch tube can meet the requirements of a high-power and high-performance motor, which not only reduces the cost of a chopper, but also reduces the requirements of connecting wires and connectors between the power output terminals and the external terminals for contact resistance and insulation, reduces the difficulty of manufacturing, and helps to improve the reliability and safety of the system.

On the other hand, the armature control signal includes m armature unit control signals respectively corresponding to the m armature chopper units and formed according to a predetermined phase staggering rule, and the field control signal includes n field unit control signals respectively corresponding to the n field chopper units and formed according to a field predetermined phase staggering rule, so the phases of current ripples of each pair of armature power output ends or field power output terminals are different from each other, the ripple peak-to-peak value of the stacked current ripples of m armature currents or n field currents is decreased, the peak-to-peak values of ripples of the output torque and speed of the separately excited direct current motor are also decreased, and the performance and life of the separately excited direct current motor are improved.

Moreover, when the brushes, field winding units, and connecting wires in the motor fail, only the failure part needs to be shielded, and other normal parts can still work, which avoids the sudden out-of-control phenomenon of the conventional separately excited direct current motor in the event of failure and improves the reliability and safety of the system.

Based on the above, the separately excited direct current motor drive apparatus of the present invention has the advantages of simple structure, short connecting wires, simple production process, easy manufacturing, convenient maintenance, low production and maintenance costs, reasonable and simple structural design, high reliability and safety, and the like, so that the present invention can not only be applied to heavy-duty electric equipment such as electric vehicles, electric pallets, rail cars, sightseeing vehicles, trucks and ships, but also can be applied to high-performance electric equipment such as numerically controlled machine tools and submarines.

DETAILED DESCRIPTION OF THE PREFERRED EMBODIMENTS

The specific embodiments of the present invention will be described below with reference to the drawings.

First Embodiment

Figure 1:
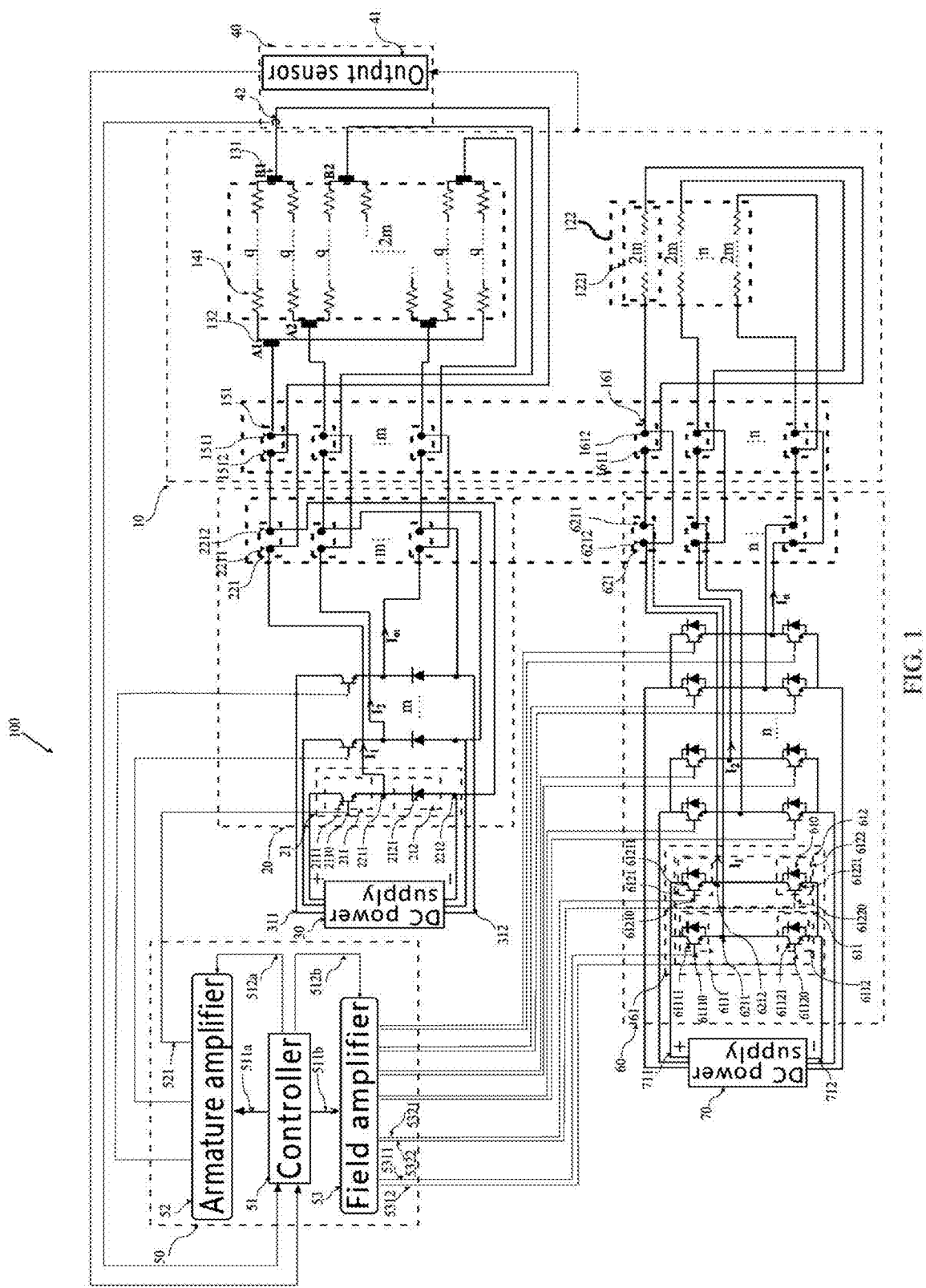
FIG. 1 is a schematic diagram of circuit connection of a separately excited direct current motor drive apparatus in a first embodiment of the present invention.
Figure 2:
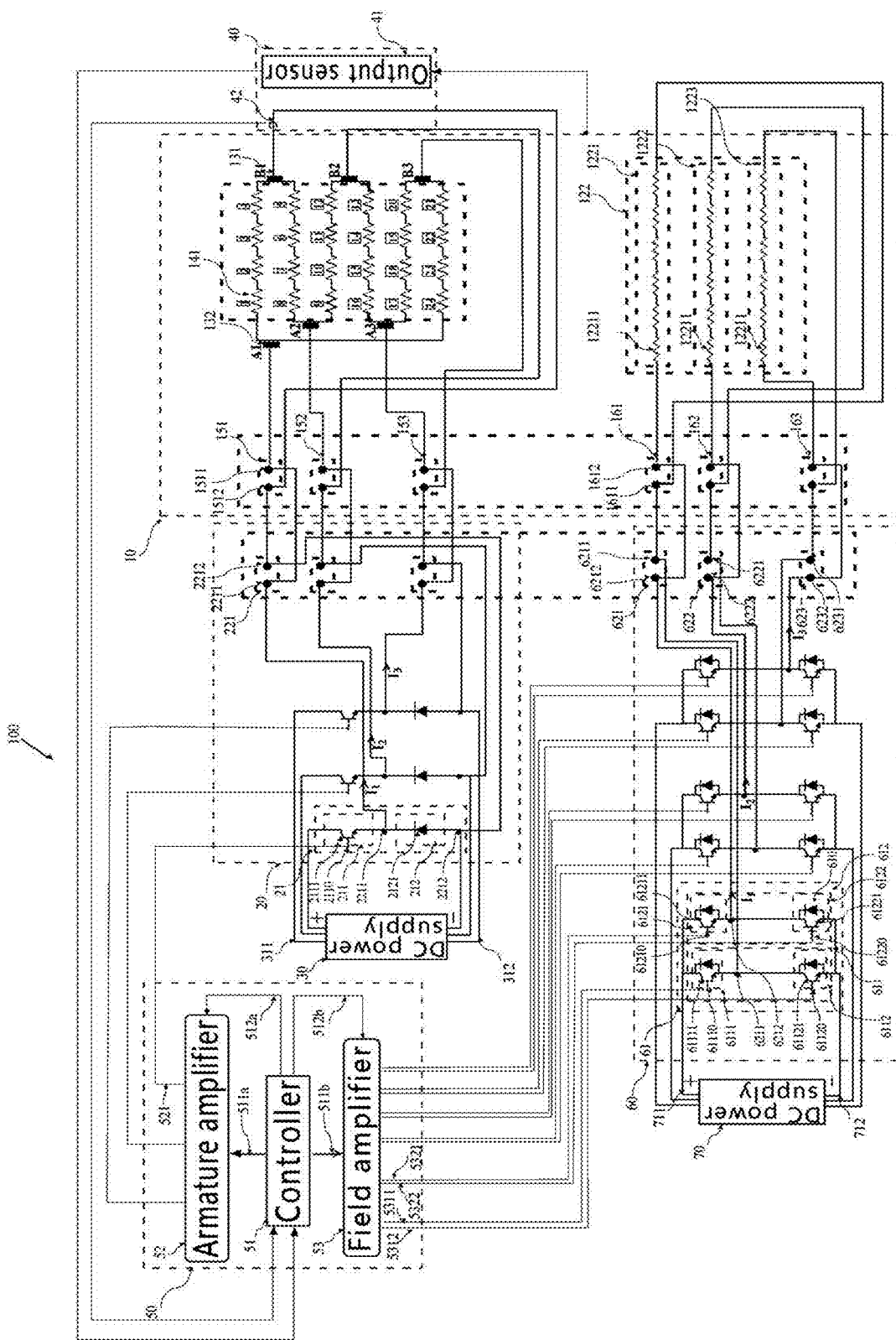
FIG. 2 is a schematic diagram of circuit connection of the separately excited direct current motor drive apparatus in the first embodiment of the present invention under a condition of m=3 and n=3.

As shown in FIGS. 1 and 2, a separately excited direct current motor drive apparatus 100 in the first embodiment is arranged in electric equipment such as an electric forklift, an electric vehicle, an electric sightseeing vehicle, an electric tractor, a large-scale machine tool spindle drive system and a ship to drive the electric equipment. The separately excited direct current motor drive apparatus 100 includes a separately excited direct current motor 10, a direct current power supply, an armature chopper 20, a field chopper 60, a sensor unit 40 and a control unit 50. The direct current power supply includes an armature direct current power supply 30 and a field direct current power supply 70. The armature direct current power supply 30 and the field direct current power supply 70 may be two different direct current power supplies, or the same direct current power supply.

Figure 3:
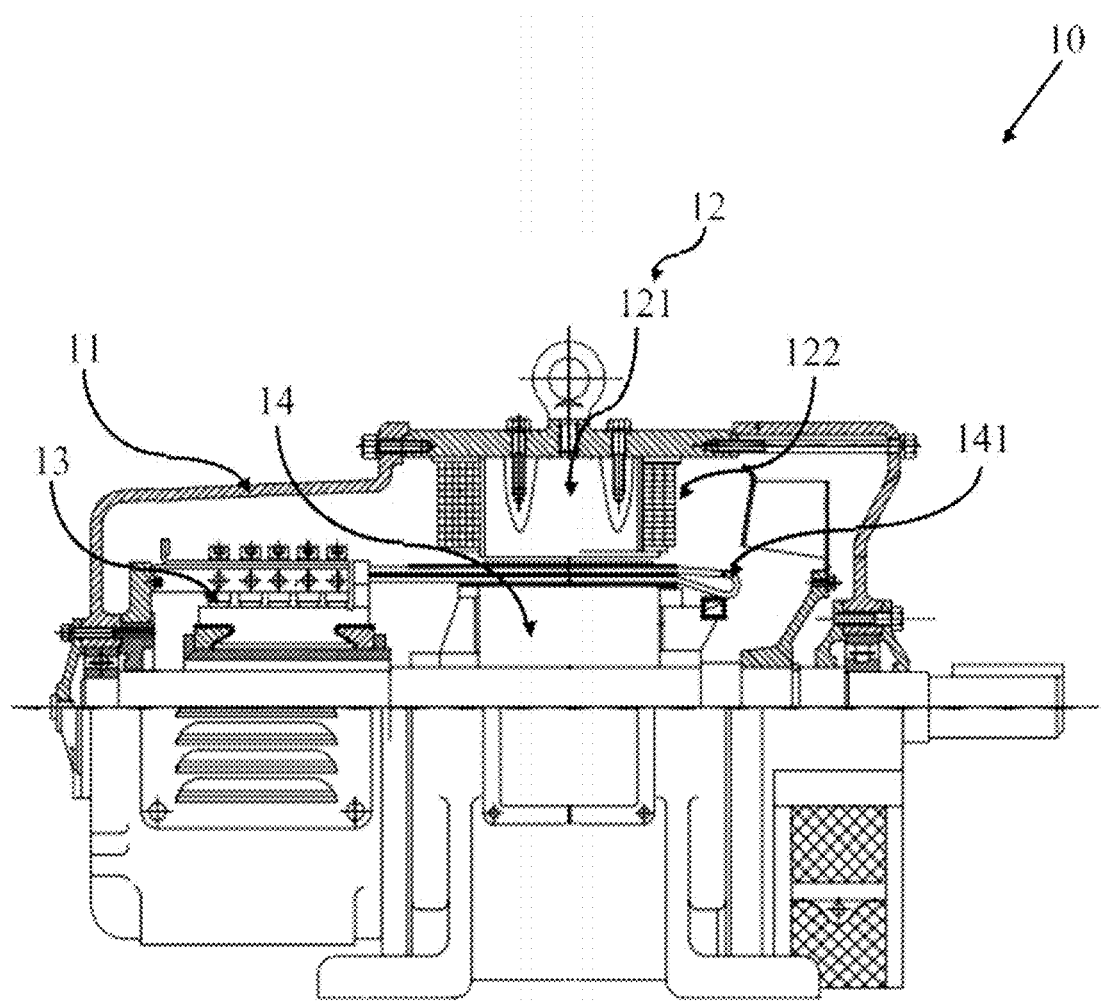
FIG. 3 is a longitudinal cross-sectional view of a separately excited direct current motor in the first embodiment of the present invention.
Figure 4:
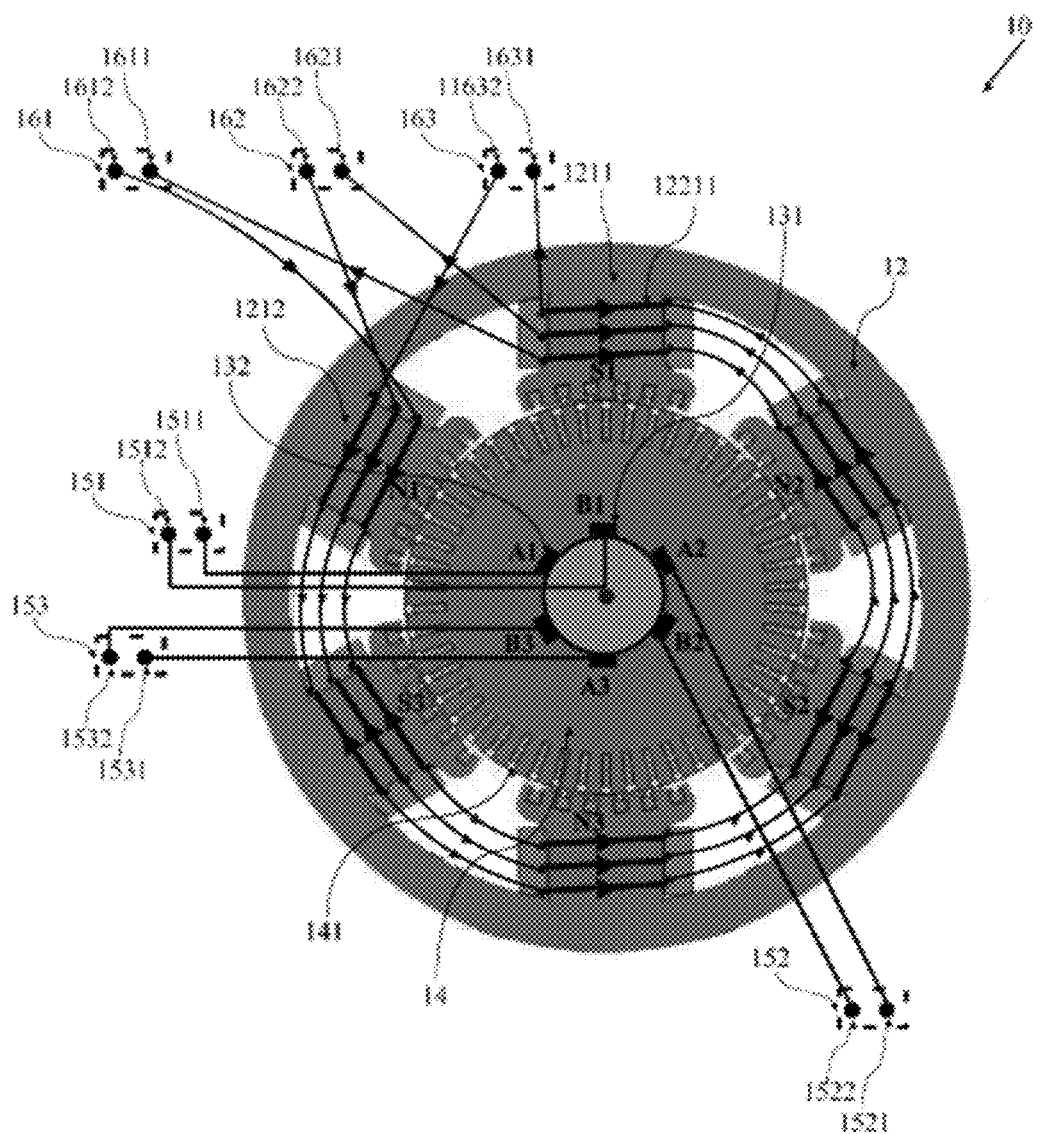
FIG. 4 is a transverse cross-sectional view of circuit connection of the separately excited direct current motor in the first embodiment of the present invention.

As shown in FIGS. 1 to 4, the separately excited direct current motor 10 has an armature rated voltage, a field rated voltage, an armature rated current and a field rated current, and includes a casing 11, a stator 12, brushes 13, a rotor 14 and a junction box (not shown). As shown in FIG. 1, the number of pairs of the brushes 13 is set to be m according to the value of the armature rated current, and m is an integer not less than 2. As shown in FIGS. 2 and 4, m is set to be 3 in the first embodiment.

As shown in FIGS. 1 to 4, the stator 12 is arranged in the casing 11, and includes m pairs of main magnetic poles 121 and one field winding portion 122. In the first embodiment, as shown in FIG. 4, the stator 12 includes three pairs, totally six main magnetic poles 121.

As shown in FIGS. 1 to 4, the stator 12 is arranged in the casing 11, and includes three pairs, totally six main magnetic poles 121 and one field winding portion 122. Each main magnetic pole 121 includes n field coils 12211, and n is set to be 3 in the first embodiment. Each field coil 12211 is respectively wound on the main magnetic pole 121 by means of an insulated conductor composed of a conductor wrapped with an insulating layer. The insulated conductor bar is either an enameled wire or an insulated copper bar. In the first embodiment, the insulated conductor bar is an enameled wire. In the first embodiment, the winding directions and the number of turns of the three field coils 12211 on each main magnetic pole 121 are the same.

As shown in FIG. 4, one field coil 12211 is extracted from each main magnetic pole 121, and a total of six field coils 12211 are connected to form a field winding unit 1221 as shown in FIG. 2. The field winding portion 122 includes three field winding units 1221, the insulated conductor bar in each field winding unit 1221 has one end and the other end distinguished according to the preset current direction of the field coil 12211, and each pair of main magnetic poles includes an S-polarity main magnetic pole 1211 and an N-polarity main magnetic pole 1212 corresponding to the winding direction of the field coil 12211 and the preset current direction of the field coil 12211. In the first embodiment, the winding directions and the number of turns of the three field coils 12211 on each main magnetic pole 121 are the same.

In each field winding unit 1221, the connection relationship of the six field coils 12211 is any one of series, parallel and series-parallel, and the connection relationship of the six field coils 12211 in each field winding unit 1221 is the same. In the first embodiment, the connection relationship of the six field coils 12211 is series.

As shown in FIGS. 3 and 4, three pairs, totally six brushes 13 are arranged in the casing 11, and each pair of brushes 13 includes an S-pole corresponding brush 131 corresponding to the S-polarity main magnetic pole 1211 and an N-pole corresponding brush 132 corresponding to the N-polarity main magnetic pole 1212.

The brush 13 is any one of a narrow brush and a wide brush. In the first embodiment, the brushes 13 are narrow brushes. Each brush 13 includes one brush body or at least two separately formed brush bodies arranged along an axis direction of the motor and electrically connected in parallel. When the brush 13 includes at least two brush bodies, an actual contact area between each brush and a commutator can be increased, thereby improving the commutation performance of the brush. As shown in FIGS. 2 to 4, the brush 13 in the first embodiment includes one brush body.

As shown in FIG. 1, two leading-out ends of each pair of brushes 13 respectively form a first armature terminal 1511 and a second armature terminal 1512, and the m first armature terminals 1511 and the m second armature terminals 1512 of all the brushes 13 correspondingly form m pairs of armature external terminals.

The n one ends of the insulated conductor bars of all the field winding units 1221 form n first field terminals 1611, the n other ends of the insulated conductor bars of all the field winding units 1221 form n second field terminals 1612, and the n first field terminals 1611 and the n second field terminals 1612 correspondingly form n pairs of field external terminals.

In the first embodiment, as shown in FIGS. 2 and 4, the first armature terminal 1511 and the second armature terminal 1512 correspondingly form a pair of armature external terminal terminals 151, the first armature terminal 1521 and the second armature terminal 1522 correspondingly form a pair of armature external terminals 152, and the first armature terminal 1531 and the second armature terminal 1532 correspondingly form a pair of armature terminals 153.

The first field terminal 1611 and the second field terminal 1612 correspondingly form a pair of field external terminals 161, the first field terminal 1621 and the second field terminal 1622 correspondingly form a pair of field external terminals 162, and the first field terminal 1631 and the second field terminal 1632 correspondingly form a pair of field external terminals 163.

Figure 5:
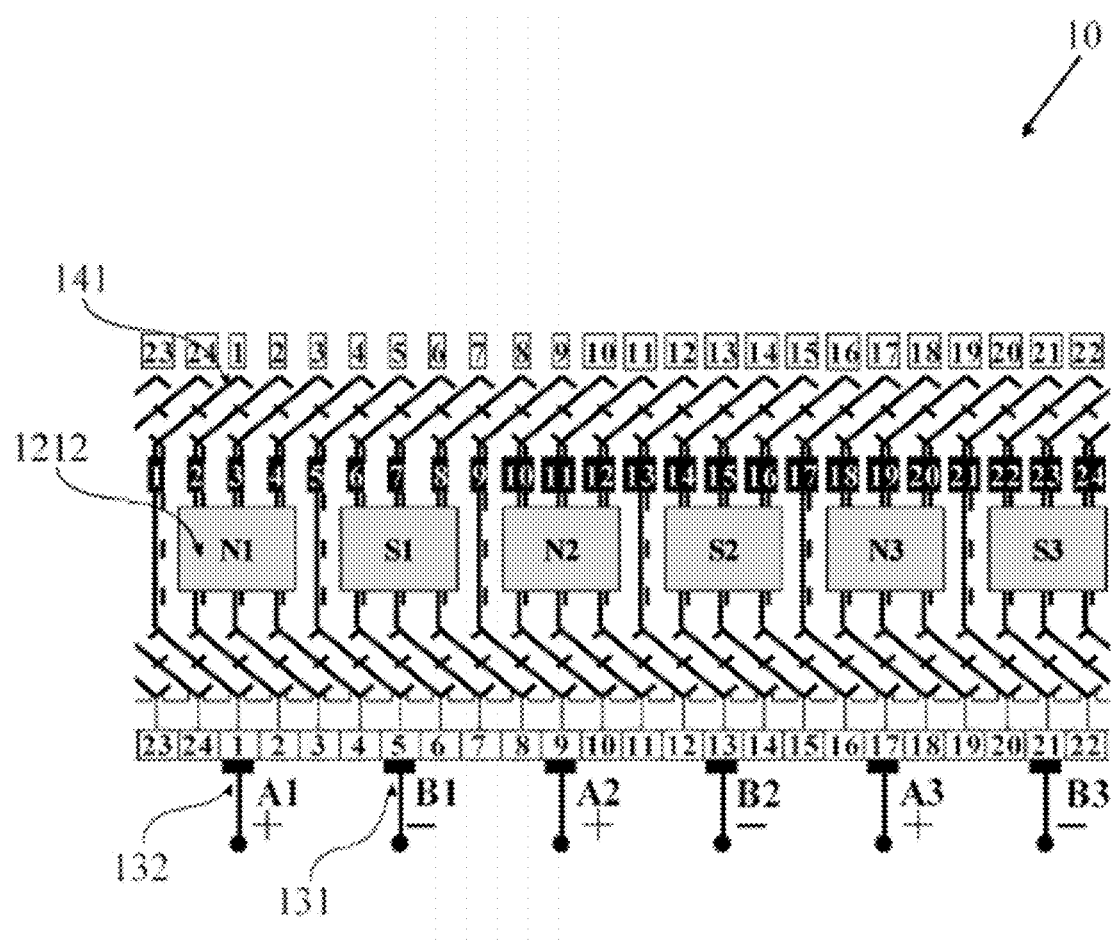
FIG. 5 is a schematic expanded view of single-stacked connection of armature windings of the separately excited direct current motor in the first embodiment of the present invention.
Figure 6:
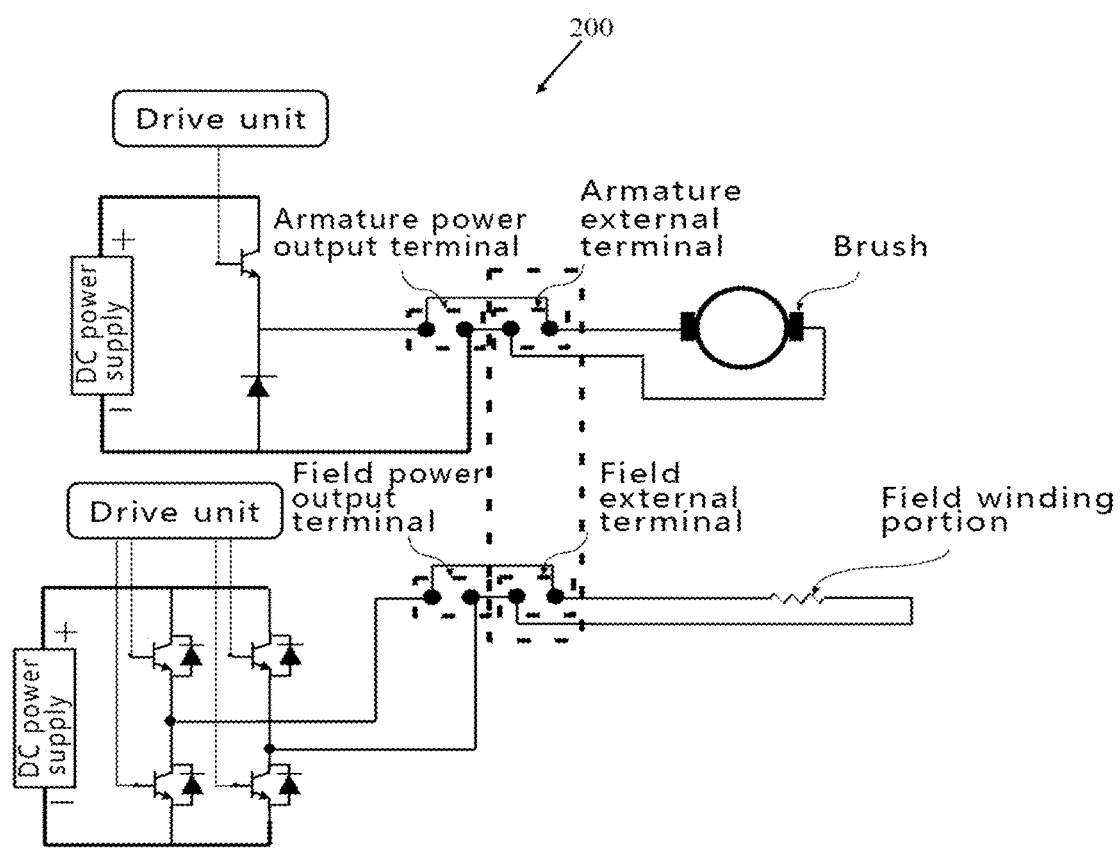
FIG. 6 is a schematic diagram of circuit connection of a conventional separately excited direct current motor drive apparatus.

As shown in FIGS. 1 to 4, the rotor 14 is arranged in the stator 12, and includes a plurality of armature windings 141 connected to one another in a predetermined connection manner. The number of the armature windings 141 is set to be 2m×q, and q is a positive integer not less than 2. The predetermined connection manner is any one of single stack, cascade and complex wave. In the first embodiment, as shown in FIG. 5, the connection manner of the plurality of armature windings 141 is single stack, two adjacent brushes 13 are connected to one armature winding branch, and each armature winding branch includes q armature windings 141.

The junction box (not shown) is fixed on the casing 11. As shown in FIGS. 2 and 4, the three pairs of armature external terminals 151, 152, 153 and the three pairs of field external terminals 161, 162, 163 are arranged in the junction box.

As shown in FIG. 1, the armature chopper 20 converts an armature constant voltage of the armature direct current power supply 30 into an armature variable voltage with a controllable average voltage based on an armature control signal transmitted by the control unit 50, and provides the armature variable voltage to the separately excited direct current motor 10. The armature chopper 20 includes m armature chopper units 21 respectively corresponding to the m pairs of brushes 13. In the first embodiment, as shown in FIG. 2, the armature chopper 20 includes three armature chopper units 21.

Each armature chopper unit 21 includes an armature upper bridge arm 211 and an armature lower bridge arm 212 connected in series with each other, as well as a first armature power output end 2211 and a second armature power output end 2212.

The armature upper bridge arm 211 includes one armature power switch tube 2111 and an armature switch control end 2110, and the armature lower bridge arm 212 includes one fly-wheel diode 2121. The armature power switch tube 2111 has one armature control pole, and the armature control pole forms the armature switch control end 2110.

As shown in FIG. 1, the first armature power output end 2211 is arranged between the armature upper bridge arm 211 and the armature lower bridge arm 212, and the second armature power output end 2212 is arranged at an end, connected to the armature direct current power supply 30, of the armature lower bridge arm 212. The m first armature power output ends 2211 of all the armature chopper units 21 and the m second armature power output ends 2212 of all the armature chopper units 21 correspondingly form m pairs of armature power output terminals 221, and the m pairs of armature power output terminals 221 are connected to the m pairs of armature external terminals 151 in a one-to-one correspondence manner.

In the first embodiment, as shown in FIG. 2, the first armature power output end 2211 and the second armature power output end 2212 correspondingly form a pair of armature power output terminals 221, the first armature power output end 2221 and the second armature power output end 2222 correspondingly form a pair of armature power output terminals 222, the first armature power output end 2231 and the second armature power output end 2232 correspondingly form a pair of armature power output terminals 223, and the three pairs of armature power output terminals 221, 222 and 223 are connected to the three pairs of armature external terminals 151, 152 and 153 in a one-to-one correspondence manner.

As shown in FIGS. 1 and 2, the armature direct current power supply 30 has an armature constant voltage corresponding to the armature rated voltage of the separately excited direct current motor 10, and has m pairs of armature power supply output terminals connected to the m armature chopper units 21 in a one-to-one correspondence manner. Each pair of armature power supply output terminals includes a positive pole 311 and a negative pole 312, the positive pole 311 is connected to the armature upper bridge arm 211 in the corresponding armature chopper 21, and the negative pole 312 is connected to the armature lower bridge arm 212 in the corresponding armature chopper 21.

As shown in FIG. 1, the field chopper 60 converts a field constant voltage of the field direct current power supply 70 into a field variable voltage with a controllable average voltage based on a field control signal transmitted by the control unit 50, and provides the field variable voltage to the separately excited direct current motor 10. The field chopper 60 includes n field chopper units 61. In the first embodiment, as shown in FIG. 2, the field chopper 60 includes three field chopper units 61.

Each field chopper unit 61 includes a first field bridge arm 611 and a second field bridge arm 612, as well as a first field power output end 6211 and a second field power output end 6212.

The first field bridge arm 611 includes a first field upper bridge arm 6111 and a first field lower bridge arm 6112 connected in series with each other, the second field bridge arm 612 includes a second field upper bridge arm 6121 and a second field lower bridge arm 6122 connected in series with each other, and the first field bridge arm 611 and the second field bridge arm 612 are connected in parallel to each other.

The first field upper bridge arm 6111 includes one field power switch tube 61111, a diode 610 connected in anti-parallel to the field power switch tube 61111, and a first field upper bridge arm switch control end 61110. The first field lower bridge arm 6112 includes one field power switch tube 61121, a diode 610 connected in anti-parallel to the field power switch tube 61121, and a first field lower bridge arm switch control end 61120. The second field upper bridge arm 6121 includes one field power switch tube 61211, a diode 610 connected in anti-parallel to the field power switch tube 61211, and a second field upper bridge arm switch control end 61210. The second field lower bridge arm 6122 includes one field power switch tube 61221, a diode 610 connected in anti-parallel to the field power switch tube 61221, and a second field lower bridge arm switch control end 61220. The field power switch tube 61111 has one field control pole, and the field control pole forms the first field upper bridge arm switch control end 61110; the field power switch tube 61121 has one field control pole, and the field control pole forms the first field lower bridge arm switch control end 61120; the field power switch tube 61211 has one field control pole, and the field control pole forms the second field upper bridge arm switch control end 61210; the field power switch tube 61221 has one field control pole, and the field control pole forms the second field lower bridge arm switch control end 61220.

As shown in FIG. 1, the first field power output end 6211 is arranged between the first field upper bridge arm 6111 and the first field lower bridge arm 6112, and the second field power output end 6212 is arranged between the second field upper bridge arm 6121 and the second field lower bridge arm 6122. The n first field power output ends 6211 of all the field chopper units 61 and the n second field power output ends 6212 of all the field chopper units 61 correspondingly form n pairs of field power output terminals 621, and the n pairs of field power output terminals 621 are connected to the n pairs of field external terminals 161 in a one-to-one correspondence manner.

In the first embodiment, as shown in FIG. 2, the first field power output end 6211 and the second field power output end 6212 correspondingly form a pair of field power output terminals 621, the first field power output end 6221 and the second field power output end 6222 correspondingly form a pair of field power output terminals 622, the first field power output end 6231 and the second field power output end 6232 correspondingly form a pair of field power output terminals 623, and the three pairs of field power output terminals 621, 622 and 623 are connected to the three pairs of field external terminals 161, 162 and 163 in a one-to-one correspondence manner.

In the first embodiment, when all the armature power switch tubes 2111 have the same maximum output current $I_1$, the maximum armature current of the separately excited direct current motor 10 is $I_{max1}$, and the power switch tubes 61111 of all the first field upper bridge arms 6111, the power switch tubes 61121 of all the first field lower bridge arms 6112, the power switch tubes 61211 of all the second field upper bridge arms 6121, and the power switch tubes 61221 of all the second field lower bridge arm 6122 have the same maximum output current $I_2$. When the maximum field current of the separately excited direct current motor 10 is $I_{max2}$, m satisfies the following condition: $m > I_{max1} \div I_1$; and n satisfies the following condition: $n > I_{max2} \div I_2$. The maximum output current is an important parameter of the power switch tube. Only less than this current value, the power switch tube can operate stably. If the working current exceeds this current value, the power switch tube will be broken down due to overcurrent and damaged accordingly.

In the first embodiment, all the armature power switch tubes and all the field power switch tubes are semi-controlled or fully-controlled devices, the semi-controlled device is an ordinary thyristor, and the fully-controlled device is any one of a power field effect transistor, a gate turn-off thyristor, an integrated gate commutated thyristor, an insulated gate bipolar transistor and a power bipolar transistor.

As shown in FIGS. 1 and 2, the field direct current power supply 70 has a field constant voltage corresponding to the field rated voltage of the separately excited direct current motor 10, and has n pairs of field power supply output terminals connected to the n field chopper units 61 in a one-to-one correspondence manner Each pair of field power supply output terminals includes a positive pole 711 and a negative pole 712, the positive pole 711 is connected to the first field upper bridge arm 6111 and the second field upper bridge arm 6121 in the corresponding field chopper 61, and the negative pole 712 is connected to the first field lower bridge arm 6112 and the second field lower bridge arm 6122 in the corresponding field chopper 61.

As shown in FIGS. 1 and 2, the sensor unit 40 is used to detect the physical quantity of the separately excited direct current motor 10 and output a feedback signal to the control unit 50. The sensor unit 40 includes an output sensor 41 and a current sensor 42.

The output sensor 41 detects the displacement, speed or torque output by the separately excited direct current motor 10 and outputs a corresponding output feedback signal to the control unit 50.

The current sensor 42 detects line current values of brush leading-out lines in the separately excited direct current motor 10 and outputs a corresponding current feedback signal to the control unit 50.

As shown in FIGS. 1 and 2, the control unit 50 includes a controller 51, an armature amplifier 52 and a field amplifier 53.

The controller 51 calculates and outputs an armature control signal 511$a$ and an armature enable signal 512$a$ to the armature amplifier 52 and outputs a field control signal 511$b$ and a field enable signal 512$b$ to the field amplifier 53 according to an external instruction signal received from the outside and corresponding to the displacement, speed, or torque output by the separately excited direct current motor 10 and the output feedback signal and current feedback signal of the sensor unit 40. The armature control signal 511$a$ includes m armature switch control signals respectively corresponding to the m armature chopper units 21 and formed according to an armature predetermined phase staggering rule, and the armature enable signal 512$a$ is used to control the operating state of the armature amplifier 52; the field control signal 511$b$ includes n field unit control signals respectively corresponding to the n field chopper units 61 and formed according to a field predetermined phase staggering rule, each field unit control signal includes four field switch control signals respectively corresponding to the four field switch control ends 61110, 61120, 61210, and 61220 of the corresponding field chopper unit 61, and the field enable signal 512$b$ is used to control the operating state of the field amplifier 53.

The armature amplifier 52 enters the operating state under the control of the armature enable signal 512$a$, amplifies the m armature switch control signals and correspondingly provides same to the m armature switch control ends 2110. The armature amplifier 52 has m armature amplified signal output ends 521 respectively corresponding to the m armature chopper units 21, and the m armature amplified signal output ends 521 are connected to the m armature switch control ends 2110 in a one-to-one correspondence manner.

In the first embodiment, the armature predetermined phase staggering rule is that phases of the m armature switch control signals are sequentially staggered by one m-th of a switching period, so that the ripple peak-to-peak value of the stacked current ripples of output currents of the armature power output terminals of the m armature chopper units is decreased, the peak-to-peak values of ripples of the output torque and speed are also decreased, and the performance and life of the separately excited direct current motor are improved. Of course, according to needs, when m is an even number, the armature predetermined phase staggering rule is that the phases of the m armature switch control signals are sequentially staggered by two (m-th)s of a switching period, so that the current ripples of output currents of the power output terminals of every two armature chopper units corresponding to every two pairs of spatially opposite brushes are the same, thereby generating a moment of couple in the motor, avoiding a friction moment between a shaft and a bearing due to the fact that the ripple of the output torque of the motor cannot form a moment of couple, reducing the wear between the shaft and the bearing, and improving the performance and life of the motor.

The field amplifier 53 enters the operating state under the control of the field enable signal 512$b$, amplifies the four field switch control signals in each field unit control signal and correspondingly provides same to the four field switch control ends 61110, 61120, 61210, and 61220. The field amplifier 53 has n field amplified signal output portions respectively corresponding to the n field chopper units 61 and formed according to a field predetermined phase staggering rule, and each field amplified signal output portion is composed of four field amplified signal output ends 5311, 5312, 5321, and 5322. The four field amplified signal output ends 5311, 5312, 5321, and 5322 of each field amplified signal output portion are respectively connected to the four field switch control ends 61110, 61120, 61210, and 61220 in the corresponding field chopper unit 61. Specifically, the field amplified signal output end 5311 is connected to the first field upper bridge arm switch control end 61110, the field amplified signal output end 5312 is connected to the first field lower bridge arm switch control end 61120, the field amplified signal output end 5321 is connected to the second field upper bridge arm switch control end 61210, and the field amplified signal output end 5322 is connected to the second field lower bridge arm switch control end 61220.

In the first embodiment, the field predetermined phase staggering rule is that n phases, respectively corresponding to the n field unit control signals, used as n field predetermined phases are sequentially staggered by one n-th of a switching period. In each field chopper unit, the two field switch control signals corresponding to the first field upper bridge arm switch control end and the second field lower bridge arm are set as field reference switch control signals, phases of the field reference switch control signals are determined according to the field predetermined phase corresponding to the field unit control signal, and the field switch control signals corresponding to the first field lower bridge arm switch control end and the second field upper bridge arm switch control end are reciprocal to the field reference switch control signals, so that the ripple peak-to-peak value of the stacked current ripples of output currents of the field power output terminals of the n field chopper units is decreased, thereby reducing the peak-to-peak values of ripples of the output torque and speed, and improving the performance and life of the separately excited direct current motor. Of course, according to needs, when n is an even number, the field predetermined phase staggering rule is that the n phases, respectively corresponding to the n field unit control signals, used as the n field predetermined phases are sequentially staggered by two (n-th)s of a switching period. In each field chopper unit, the two field switch control signals corresponding to the first field upper bridge arm switch control end and the second field lower bridge arm are set as the field reference switch control signals, the phases of the field reference switch control signals are determined according to the field predetermined phase corresponding to the field unit control signal, and the field switch control signals corresponding to the first field lower bridge arm switch control end and the second field upper bridge arm switch control end are reciprocal to the field reference switch control signals, so that the current ripples of output currents of the power output terminals of every two field chopper units corresponding to every two pairs of spatially opposite brushes are the same, thereby generating a moment of couple in the motor, avoiding a friction moment between a shaft and a bearing due to the fact that the ripple of the output torque of the motor cannot form a moment of couple, reducing the wear between the shaft and the bearing, and improving the performance and life of the motor.

In a steady state, the peak-to-peak value of current ripples is the difference between the maximum value and the minimum value, and the ripple factor is the percentage of the peak-to-peak value to the average value. The following description is exemplified by three pairs of armature power output terminals 221, 222 and 223 whose frequencies of current ripples of output currents are the same but whose phases are sequentially staggered by ⅓ of a switching period, three pairs of field output terminals 621, 622 and 623 whose frequencies of current ripples of output currents are the same but whose phases are sequentially staggered by ⅓ of a switching period, and an armature chopper 20 and a field chopper 60 having 1 kHz switching frequencies.

Figure 7:
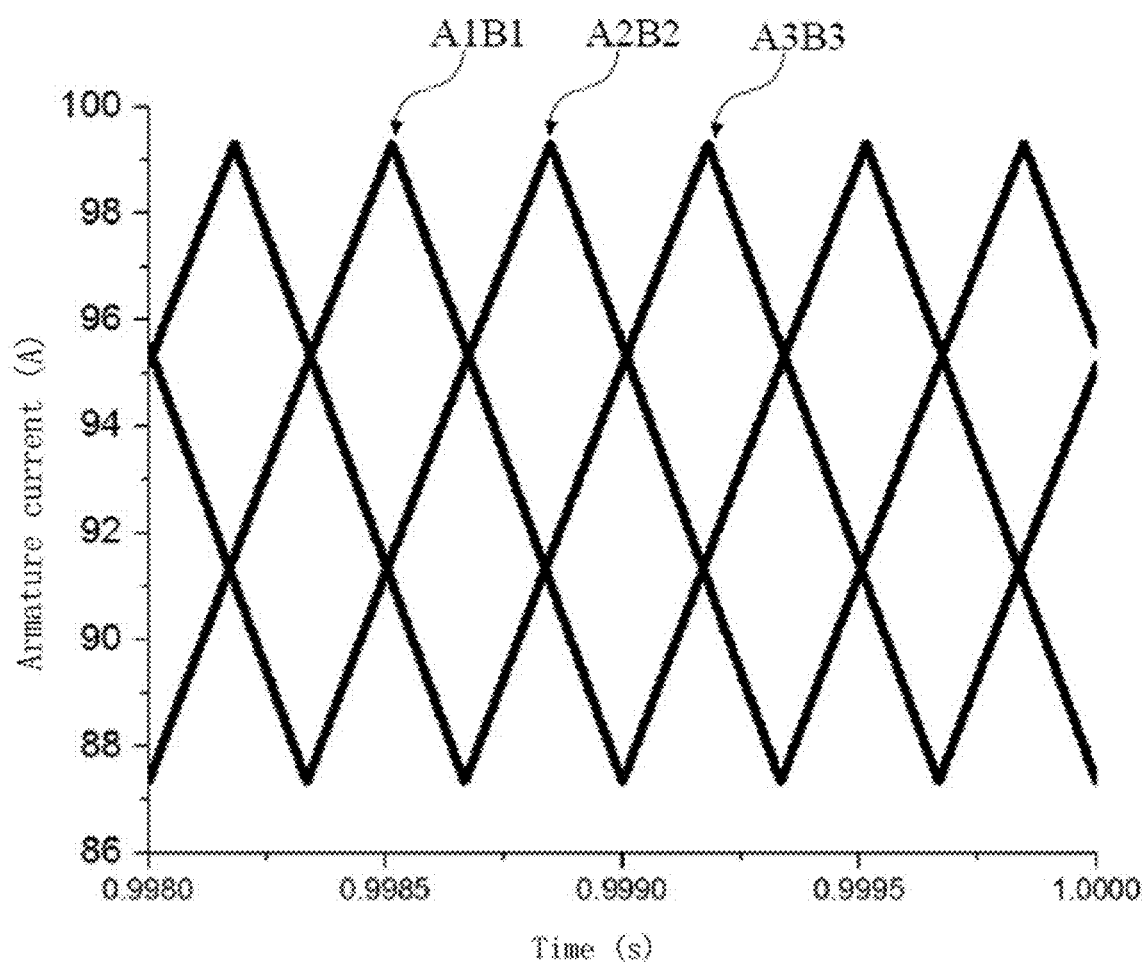
FIG. 7 is a waveform diagram of input currents of three pairs of brushes of the separately excited direct current motor in the first embodiment of the present invention.

As shown in FIG. 7, the input current ripples of three pairs of brushes A1B1, A2B2 and A3B3 of the separately excited direct current motor in the first embodiment are all equal to 99.31−87.33=11.99 amperes, their average values are all equal to 93.32 amperes, and their ripple factors are all equal to 11.99/93.32×100%=12.84%.

Figure 8:
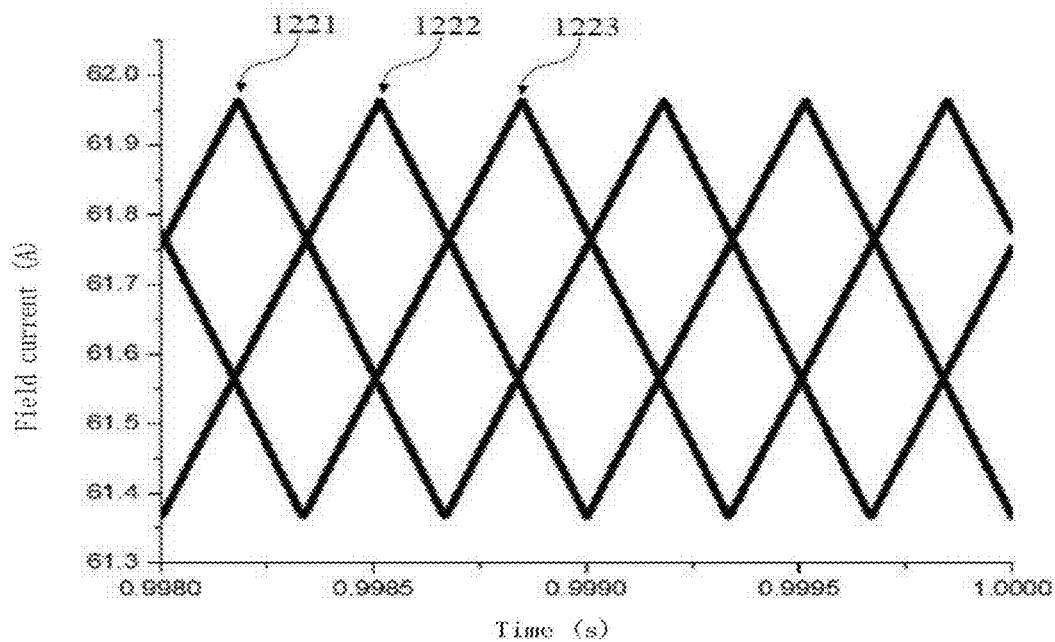
FIG. 8 is a waveform diagram of input currents of three pairs of field windings of the separately excited direct current motor in the first embodiment of the present invention.

As shown in FIG. 8, the input current ripples of three field winding units 1221, 1222 and 1223 of the separately excited direct current motor in the first embodiment are all equal to 61.97-61.37=0.60 ampere, their average values are all equal to 61.67 amperes, and their ripple factors are all equal to 0.60/61.67×100%=0.97%.

Figure 9:
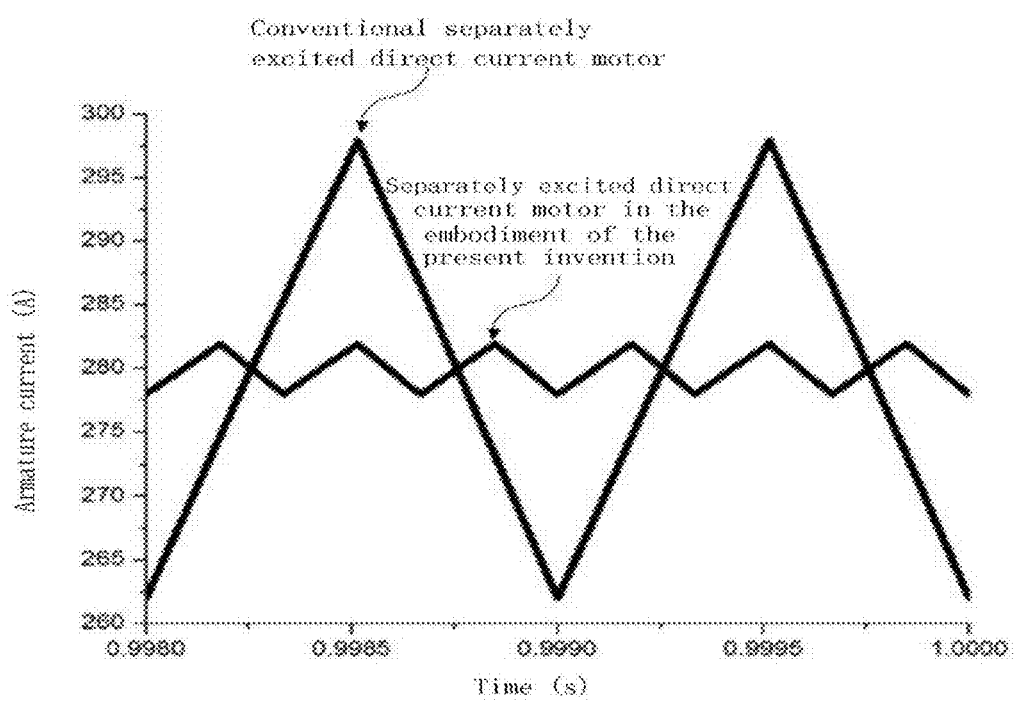
FIG. 9 is a comparison diagram of armature current of the separately excited direct current motor in the first embodiment of the present invention and armature current of the conventional separately excited direct current motor.

As shown in FIG. 9, in the steady state, the armature current of the separately excited direct current motor in the first embodiment is equal to the sum of the currents of the three pairs of brushes A1B1, A2B2 and A3B3 in FIG. 7, the ripple of the armature current is 281.95−277.98=3.97 amperes, the average value is equal to 279.97 amperes, and the ripple factor is equal to 3.97/279.97×100%=1.42%. The armature current ripple of the conventional separately excited direct current motor is equal to 297.94−261.98=35.96 amperes, the average value is equal to 279.97 amperes, and the ripple factor is equal to 35.96/279.97×100%=12.84%. Although the separately excited current motor in the first embodiment and the conventional separately excited direct current motor have the same average armature current value, the armature current ripple and ripple factor of the separately excited direct current motor in the first embodiment are only one ninth of those of the conventional separately excited direct current motor.

Figure 10:
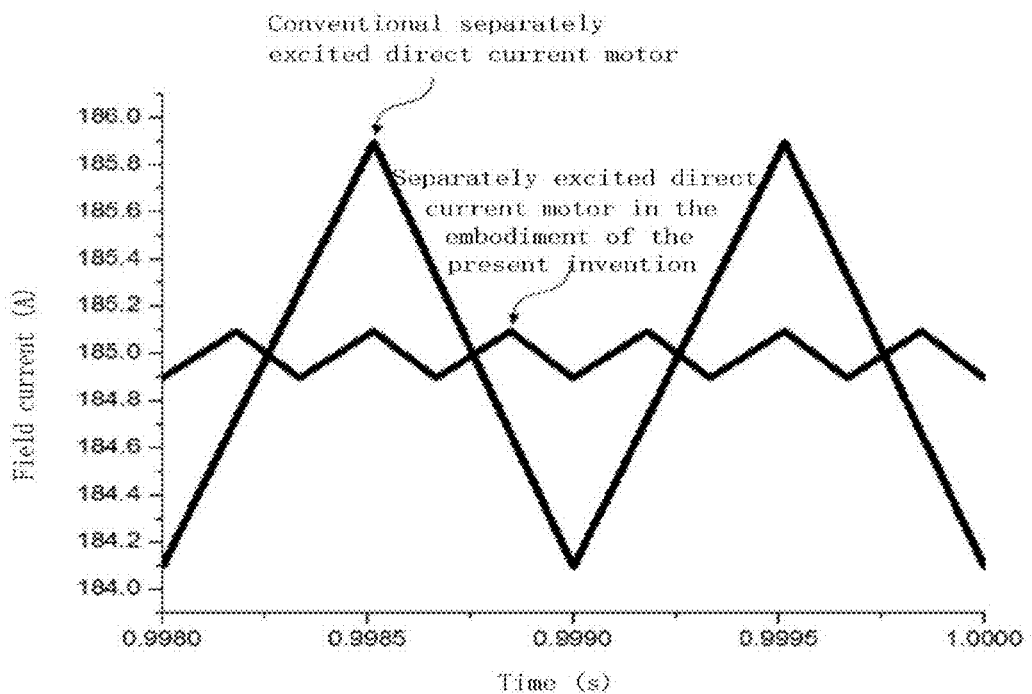
FIG. 10 is a comparison diagram of field current of the separately excited direct current motor in the first embodiment of the present invention and field current of the conventional separately excited direct current motor.

As shown in FIG. 10, in the steady state, the field current of the separately excited direct current motor in the first embodiment of the present invention is equal to the sum of the currents of the three field winding units 1221, 1222 and 1223 in FIG. 8, the ripple of the field current is 185.10−184.90=0.2 ampere, the average value is equal to 185.0 amperes, and the ripple factor is equal to 0.2/185×100%=0.11%. The field current ripple of the conventional separately excited direct current motor is equal to 185.9−184.1=1.8 amperes, the average value is equal to 185.0 amperes, and the ripple factor is equal to 1.8/185.0×100%=0.97%. Although the separately excited direct current motor in the first embodiment and the conventional separately excited direct current motor have the same average field current value, the field current ripple and ripple factor of the separately excited direct current motor in the first embodiment are only one ninth of those of the conventional separately excited direct current motor.

It is known that the electromagnetic torque and motion equation of the separately excited direct current motor are as follows:

$$\begin{cases} T_{em} = C_T \Phi I_a = L_{af} I_f I_a & (1) \\ T_{em} - T_{load} = J \frac{d}{dt}\Omega & (2) \end{cases}$$

Where, $T_{em}$ is the electromagnetic torque; $C_T$ is a torque constant; $\Phi$ is a magnetic flux of a main magnetic field; $L_{af}$ is a mutual inductance between the field winding portion and the armature winding, which is a constant; $I_f$ is the field current; $I_a$ is the armature current; $T_{load}$ is a load torque; J is a moment of inertia of a load, which is a constant; and $\Omega$ is an output angular velocity.

In the first embodiment, the input current of the separately excited direct current motor is equal to the armature current, and the rated input current of the separately excited direct current motor is the maximum input current of the motor in the rated operating state.

In equation (1), the electromagnetic torque $T_{em}$ is directly proportional to the product of the armature current $I_a$ and the magnetic flux $\Phi$ of the main magnetic field. The main magnetic field of the direct current motor is excited by the field winding portion powered by the chopper. According to equation (1), it can be seen that the electromagnetic torque $T_{em}$ is directly proportional to the product of the armature current $I_a$ and the field current $I_f$, and the ripple factor of the field current $I_f$ and the ripple factor of the armature current $I_a$ will cause the generation of a larger ripple factor by the electromagnetic torque $T_{em}$, a larger pulse or ripple of the output angular velocity $\Omega$, and worse performance of the drive apparatus and the electric equipment.

Figure 11:
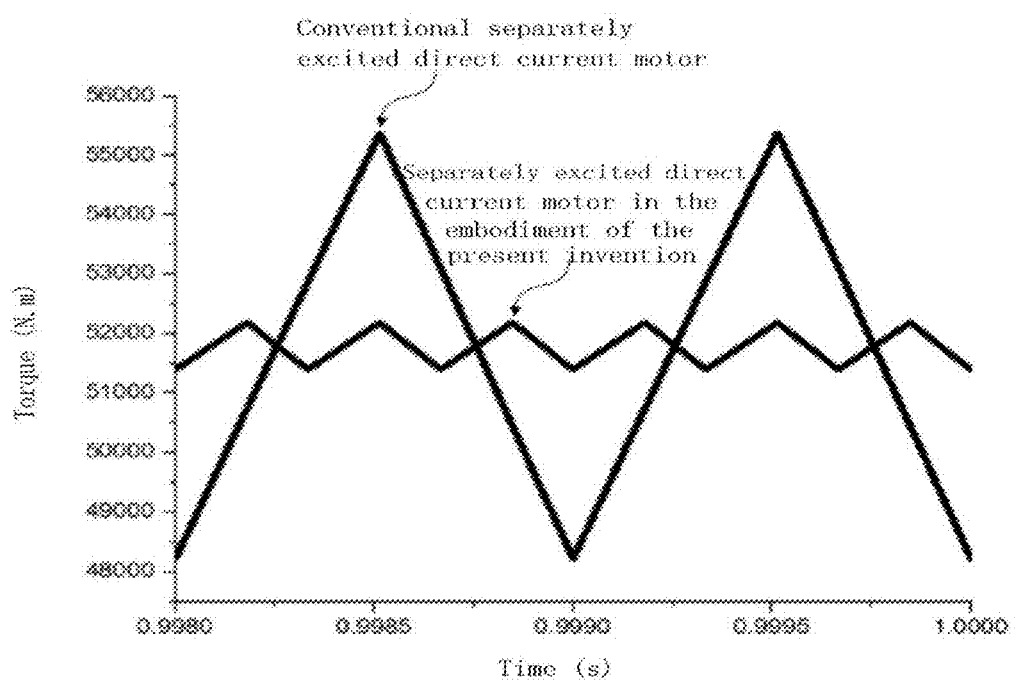
FIG. 11 is a comparison diagram of a torque of the separately excited direct current motor in the first embodiment of the present invention and a torque of the conventional separately excited direct current motor.

In the first embodiment, $L_{af}$ is 1. In the steady state, as shown in FIG. 11, the torque ripple of the separately excited direct current motor in the first embodiment is equal to 52188.25−51398.38=789.87 N·m, the average value is equal to 51793.56 N·m, and the ripple factor is equal to 1.53%. The torque ripple of the conventional separately excited direct current motor is equal to 55386.15−48229.93=7156.21 N·m, the average value is equal to 51798.89 N·m, and the ripple factor is equal to 13.82%.

Figure 12:
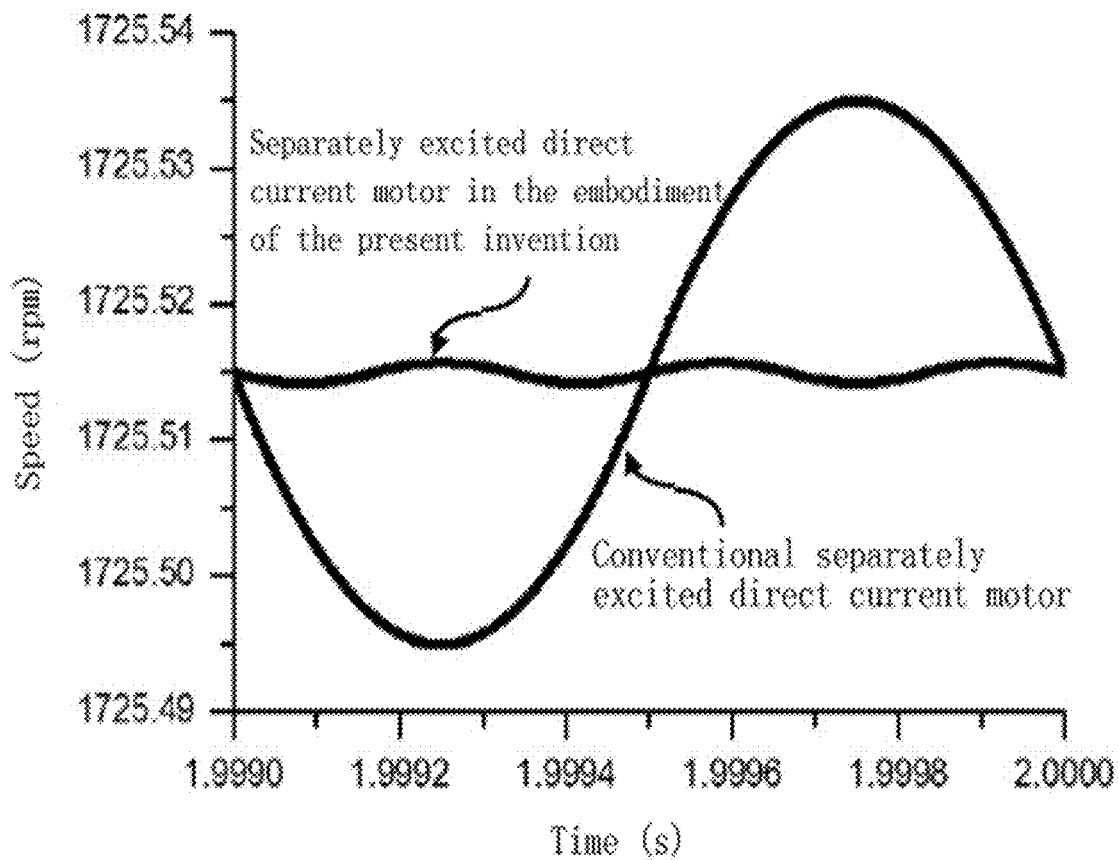
FIG. 12 is a comparison diagram of speed of the separately excited direct current motor in the first embodiment of the present invention and speed of the conventional separately excited direct current motor.

As shown in FIG. 12, in the steady state, the peak-to-peak value of the speed ripple of the separately excited direct current motor 10 in the first embodiment is equal to 1725.5157−1725.5142=0.0015 rpm, the average value is equal to 1725.515 rpm, and the ripple factor is equal to 0.000087%. The peak-to-peak value of the speed ripple of the conventional separately excited direct current motor is equal to 1725.535−1725.4949=0.0401 rpm, the average value is equal to 1725.515 rpm, and the ripple factor is equal to 0.002324%. Although the separately excited direct current motor 10 in the first embodiment and the conventional separately excited direct current motor have the same average speed, the peak-to-peak value and ripple factor of the speed ripple of the separately excited direct current motor 10 in the first embodiment are 1/26.7 of those of the conventional separately excited direct current motor.

That is, although the separately excited direct current motor 10 in the first embodiment and the conventional separately excited direct current motor substantially have the same average torque value, the peak-to-peak value and ripple factor of the torque ripple of the separately excited direct current motor 10 in the first embodiment are one ninth of those of the conventional separately excited direct current motor, which reduces the peak-to-peak value and ripple factor of the ripple of the output torque of the motor, thereby reducing the peak-to-peak value and ripple factor of the ripple of the output speed of the motor. The speed ripple factor of the separately excited direct current motor in the first embodiment is only one twenty-sixth of that of the conventional separately excited direct current motor, which ultimately achieves the purposes of reducing electromagnetic interference, vibration and noise of the motor and improving the performance of the separately excited direct current motor and the drive apparatus.

Second Embodiment

In the second embodiment, the same symbols are given to the same structures as those in the first embodiment, and the same descriptions are omitted.

Figure 13:
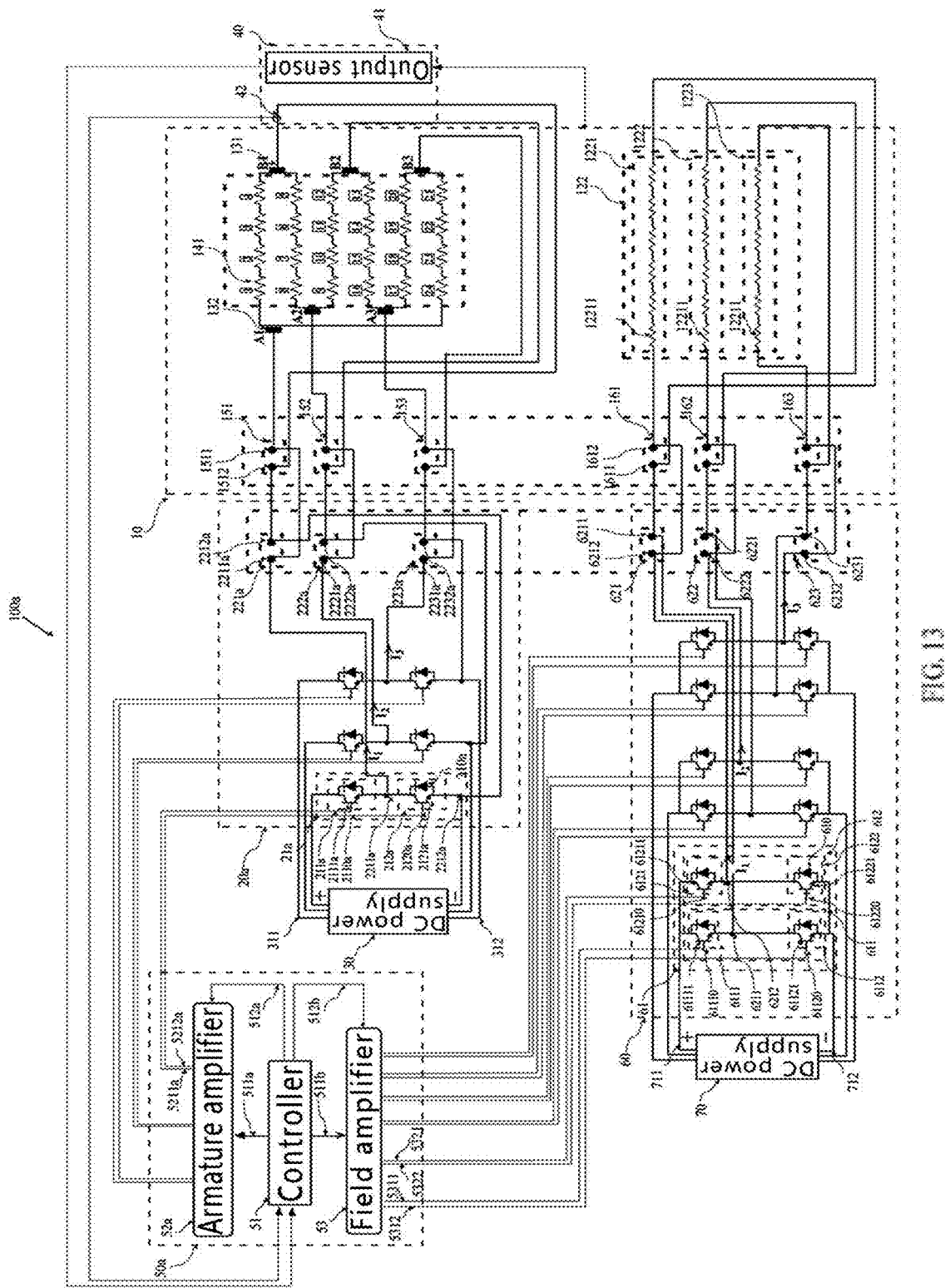
FIG. 13 is a schematic diagram of circuit connection of a separately excited direct current motor drive apparatus in a second embodiment of the present invention under a condition of m=3 and n=3.

As shown in FIG. 13, a separately excited direct current motor drive apparatus 100a includes a separately excited direct current motor 10, an armature chopper 20a, an armature direct current power supply 30, a field chopper 60, a field direct current power supply 70, a sensor unit 40, and a control unit 50a. Both m and n are set to be 3. The armature chopper 20a includes three armature chopper units 21a. Each armature chopper unit 21a includes an armature upper bridge arm 211a and an armature lower bridge arm 212a connected in series with each other, as well as a first armature power output end 2211a and a second armature power output end 2212a. The armature upper bridge arm 211a includes one armature power switch tube 2111a, a diode 210a connected in anti-parallel to the armature power switch tube 2111a, and an armature switch control end 2110a. The armature lower bridge arm 212a includes one armature power switch tube 2121a, a diode 210a connected in anti-parallel to the armature power switch tube 2121a, and an armature lower bridge arm switch control end 2120a. The armature power switch tube 2111a has one armature control pole, and the armature control pole forms the armature switch control end 2110a. The armature power switch tube 2121a has one armature control pole, and the armature control pole forms the armature switch control end 2120a.

The first armature power output end 2211a is arranged between the armature upper bridge aim 211a and the armature lower bridge arm 212a, and the second armature power output end 2212a is arranged at an end, connected to the armature direct current power supply 30, of the armature lower bridge aim 212a. The first armature power output end 2211a and the second armature power output end 2212a correspondingly form a pair of armature power output terminals 221a, the first armature power output end 2221a and the second armature power output end 2222a correspondingly form a pair of armature power output terminals 222a, the first armature power output end 2231a and the second armature power output end 2232a correspondingly form a pair of armature power output terminals 223a, and the three pairs of armature power output terminals 221a, 222a and 223a are connected to the three pairs of armature external terminals 151, 152 and 153 in a one-to-one correspondence manner.

The control unit 50a includes a controller 51, an armature amplifier 52a and a field amplifier 53.

The armature control signal 511a includes m armature unit control signals respectively corresponding to the m armature chopper units 21a and formed according to an armature predetermined phase staggering rule. Each armature unit control signal includes two armature switch control signals corresponding to the two armature switch control ends 2110a and 2120a of the corresponding armature chopper unit 21a.

The armature amplifier 52a amplifies the two armature switch control signals in each armature unit control signal and correspondingly provides same to the two armature switch control ends 2110a and 2120a. The armature amplifier 52a has m armature amplified signal output portions respectively corresponding to the m armature chopper units 21a, and each armature amplified signal output portion is composed of two armature amplified signal output ends 5211a and 5212a. The two armature amplified signal output ends 5211a and 5212a of each armature amplified signal output portion are correspondingly connected to the two armature switch control ends 2110a and 2120a in the corresponding armature chopper unit 21a. Specifically: the armature amplified signal output end 5211a is connected to the armature upper bridge arm switch control end 2110a, and the armature amplified signal output end 5212a is connected to the armature lower bridge arm switch control end 2120a.

In the second embodiment, the armature predetermined phase staggering rule is that m phases respectively corresponding to the m armature unit control signals and used as m armature predetermined phases are sequentially staggered by one m-th of a switching period. In each armature chopper unit, the armature switch control signal corresponding to the armature upper bridge arm switch control end is set as an armature reference switch control signal, a phase of the armature reference switch control signal is determined according to the armature predetermined phase corresponding to the armature unit control signal, and the armature switch control signal corresponding to the armature lower bridge arm switch control end is reciprocal to the armature reference switch control signal, so that the ripple peak-to-peak value of the stacked current ripples of output currents of the armature power output terminals of the m armature chopper units is decreased, thereby reducing the peak-to-peak values of ripples of the output torque and speed, and improving the performance and life of the separately excited direct current motor. Of course, according to needs, when m is an even number, the armature predetermined phase staggering rule is that the m phases respectively corresponding to the m armature unit control signals and used as the m armature predetermined phases are sequentially staggered by two (m-th)s of a switching period. In each armature chopper unit, the armature switch control signal corresponding to the armature upper bridge arm switch control end is set as the armature reference switch control signal, the phase of the armature reference switch control signal is determined according to the armature predetermined phase corresponding to the armature unit control signal, and the armature switch control signal corresponding to the armature lower bridge arm switch control end is reciprocal to the armature reference switch control signal, so that the current ripples of output currents of the power output terminals of every two armature chopper units corresponding to every two pairs of spatially opposite brushes are the same, thereby generating a moment of couple in the motor, avoiding a friction moment between a shaft and a bearing due to the fact that the ripple of the output torque of the motor cannot form a moment of couple, reducing the wear between the shaft and the bearing, and improving the performance and life of the motor.

The series excited direct current motor of the second embodiment can work in the state shown in FIGS. 7 to 12, and has the same functions and effects as in the first embodiment. In addition, the armature upper bridge arm and the armature lower bridge arm respectively include at least one armature power switch tube and at least one diode connected in anti-parallel to the armature power switch tube. The series excited direct current motor can also work in a generator state, in which the energy is fed back to the power supply during deceleration and braking to improve system performance.

Third Embodiment

In the third embodiment, the same symbols are given to the same structures as those in the first embodiment, and the same descriptions are omitted.

Figure 14:
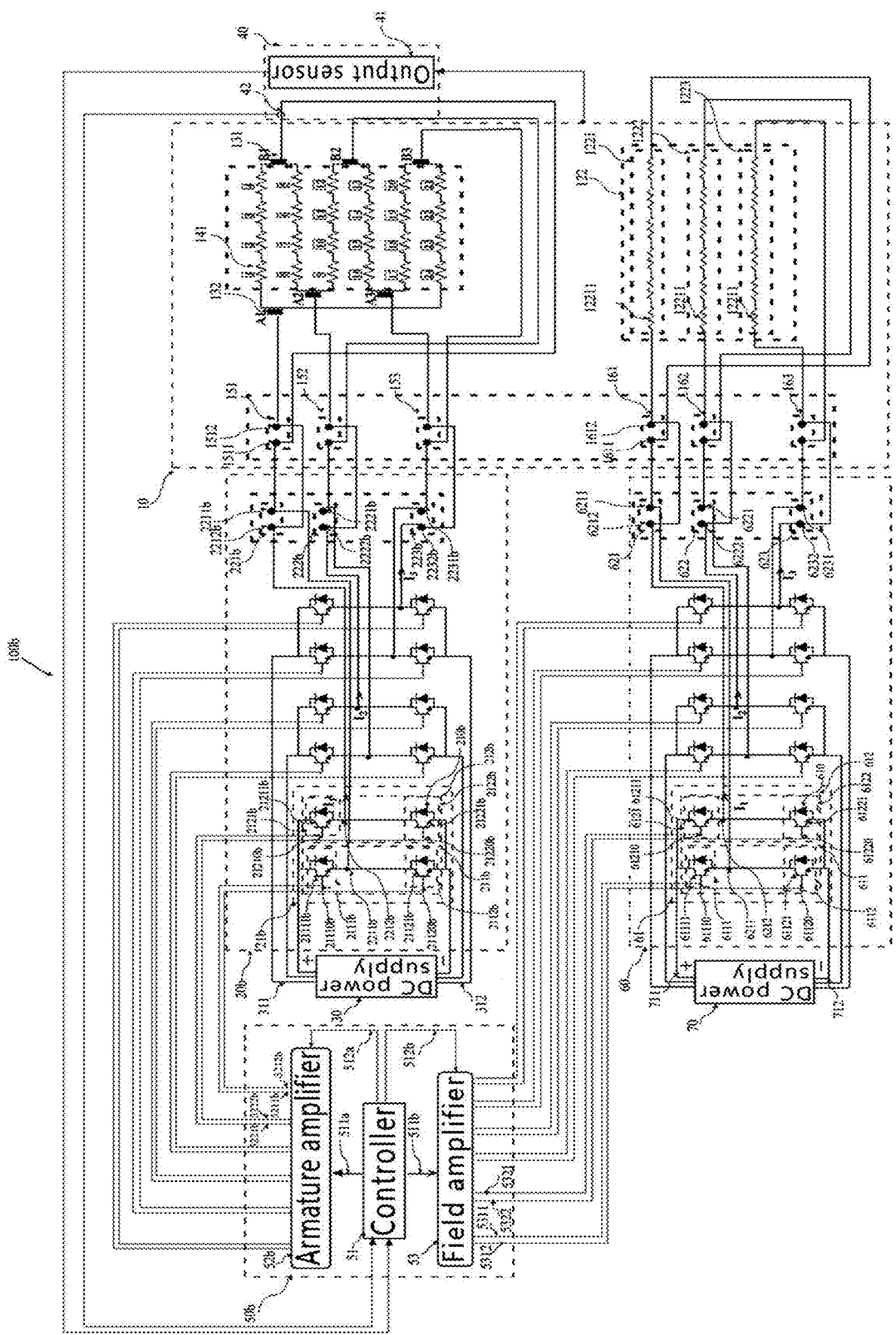
FIG. 14 is a schematic diagram of circuit connection of a separately excited direct current motor drive apparatus in a third embodiment of the present invention under a condition of m=3 and n=3.

As shown in FIG. 14, a separately excited direct current motor drive apparatus 100b in the third embodiment includes a separately excited direct current motor 10, an armature chopper 20b, an armature direct current power supply 30, a field chopper 60, a field direct current power supply 70, a sensor unit 40, and a control unit 50b. The armature chopper 20b includes three armature chopper units 21b.

Each armature chopper unit 21b includes a first armature bridge arm 211b and a second armature bridge arm 212b, as well as a first armature power output end 2211b and a second armature power output end 2212b.

The first armature bridge arm 211b includes a first armature upper bridge arm 2111b and a first armature lower bridge arm 2112b connected in series with each other, the second armature bridge arm 212b includes a second armature upper bridge arm 2121b and a second armature lower bridge arm 2122b connected in series with each other, and the first armature bridge arm 211b and the second armature bridge arm 212b are connected in parallel to each other.

The first armature upper bridge arm 2111b includes one armature power switch tube 21111b, a diode 210b connected in anti-parallel to the armature power switch tube 21111b, and a first armature upper bridge arm switch control end 21110b. The first armature lower bridge arm 2112b includes one armature power switch tube 21121b, a diode 210b connected in anti-parallel to the armature power switch tube 21121b, and a first armature lower bridge arm switch control end 21120b. The second armature upper bridge arm 2121b includes one armature power switch tube 21211b, a diode 210b connected in anti-parallel to the armature power switch tube 21211b, and a second armature upper bridge arm switch control end 21210b. The second armature lower bridge arm 2122b includes one armature power switch tube 21221b, a diode 210b connected in anti-parallel to the armature power switch tube 21221b, and a second armature lower bridge arm switch control end 21220b. The armature power switch tube 21111b has one armature control pole, and the armature control pole forms the first armature upper bridge arm switch control end 21110b; the armature power switch tube 21121b has one armature control pole, and the armature control pole forms the first armature lower bridge aim switch control end 21120b; the armature power switch tube 21211b has one armature control pole, and the armature control pole forms the second armature upper bridge arm switch control end 21210b; the armature power switch tube 21221b has one armature control pole, and the armature control pole forms the second armature lower bridge aim switch control end 21220b.

The first armature power output end 2211b is arranged between the first armature upper bridge aim 2111b and the first armature lower bridge arm 2112b, and the second armature power output end 2212b is arranged between the second armature upper bridge arm 2121b and the second armature lower bridge arm 2122b.

The first armature power output end 2211b and the second armature power output end 2212b correspondingly form a pair of armature power output terminals 221b, the first armature power output end 2221b and the second armature power output end 2222b correspondingly form a pair of armature power output terminals 222b, the first armature power output end 2231b and the second armature power output end 2232b correspondingly form a pair of armature power output terminals 223b, and the three pairs of armature power output terminals 221b, 222b and 223b are connected to the three pairs of armature external terminals 151, 152 and 153 in a one-to-one correspondence manner.

The control unit 50b includes a controller 51, an armature amplifier 52b and a field amplifier 53.

The armature control signal 511a includes m armature unit control signals respectively corresponding to the m armature chopper units 21 and formed according to an armature predetermined phase staggering rule. Each armature unit control signal includes four armature switch control signals corresponding to the four armature switch control ends 21110b, 21120b, 21210b, and 21220b of the corresponding armature chopper unit 21b. The armature amplifier 52b amplifies the four armature switch control signals in each armature unit control signal and correspondingly provides same to the four armature switch control ends 21110b, 21120b, 21210b, and 21220b. The armature amplifier 52b has m armature amplified signal output portions respectively corresponding to the m armature chopper units 21b, and each armature amplified signal output portion is composed of four armature amplified signal output ends 5211b, 5212b, 5221b, and 5222b. The four armature amplified signal output ends 5211b, 5212b, 5221b, and 5222b of each armature amplified signal output portion are correspondingly connected to the four armature switch control ends 21110b, 21120b, 21210b, and 21220b in the corresponding armature chopper unit 21b. Specifically: the armature amplified signal output end 5211b is connected to the first armature upper bridge aim switch control end 21110b, the armature amplified signal output end 5212b is connected to the first armature lower bridge arm switch control end 21120b, the armature amplified signal output end 5221b is connected to the second armature upper bridge arm switch control end 21210b, and the armature amplified signal output end 5222b is connected to the second armature lower bridge arm switch control end 21220b.

In the third embodiment, the armature predetermined phase staggering rule is that m phases respectively corresponding to the m armature unit control signals and used as m armature predetermined phases are sequentially staggered by one m-th of a switching period. In each armature chopper unit, the two armature switch control signals corresponding to the first armature upper bridge arm switch control end and the second armature lower bridge arm are set as armature reference switch control signals, phases of the armature reference switch control signals are determined according to the armature predetermined phase corresponding to the armature unit control signal, and the armature switch control signals corresponding to the first armature lower bridge arm switch control end and the second armature upper bridge arm switch control end are reciprocal to the armature reference switch control signals, so that the ripple peak-to-peak value of the stacked current ripples of output currents of the armature power output terminals of the m armature chopper units is decreased, thereby reducing the peak-to-peak values of ripples of the output torque and speed, and improving the performance and life of the separately excited direct current motor. Of course, according to needs, when m is an even number, the armature predetermined phase staggering rule is that the m phases respectively corresponding to the m armature unit control signals and used as the m armature predetermined phases are sequentially staggered by two (m-th)s of a switching period. In each armature chopper unit, the two armature switch control signals corresponding to the first armature upper bridge arm switch control end and the second armature lower bridge arm are set as the armature reference switch control signals, the phases of the armature reference switch control signals are determined according to the armature predetermined phase corresponding to the armature unit control signal, and the armature switch control signals corresponding to the first armature lower bridge arm switch control end and the second armature upper bridge arm switch control end are reciprocal to the armature reference switch control signals, so that the current ripples of output currents of the power output terminals of every two armature chopper units corresponding to every two pairs of spatially opposite brushes are the same, thereby generating a moment of couple in the motor, avoiding a friction moment between a shaft and a bearing due to the fact that the ripple of the output torque of the motor cannot form a moment of couple, reducing the wear between the shaft and the bearing, and improving the performance and life of the motor.

The series excited direct current motor of the third embodiment can work in the state shown in FIGS. 7 to 12, and has the same functions and effects as in the first embodiment. In addition, the first armature upper bridge arm, the first armature lower bridge arm, the second armature upper bridge aim and the second armature lower bridge arm respectively include at least one armature power switch tube and at least one diode connected in anti-parallel to the armature power switch tube, so the series excited direct current motor can work in four quadrants, with flexible control and high efficiency.

Functions and Effects of the Embodiments

According to the separately excited direct current motor drive apparatus and the electric equipment including the separately excited direct current motor drive apparatus in the first to third embodiments of the present invention, the armature chopper has m armature chopper units, each armature chopper unit has a first armature power output end, a second armature power output end and w armature switch control ends, the armature control signal includes m armature unit control signals respectively corresponding to the m armature chopper units and formed according to a predetermined phase staggering rule, each armature unit control signal includes w armature switch control signals corresponding to the w armature switch control ends in the corresponding armature chopper unit, the w armature switch control ends are used to correspondingly receive the w armature switch control signals, the m first armature power output ends of all the armature chopper units and the m second armature power output ends of all the armature chopper units correspondingly form m pairs of armature power output terminals, the field chopper has n field chopper units, each field chopper unit includes a first field bridge arm and a second field bridge arm, as well as a first field power output end and a second field power output end, the first field bridge arm includes a first field upper bridge arm and a first field lower bridge connected in series with each other, the second field bridge arm includes a second field upper bridge arm and a second field lower bridge arm connected in series with each other, the first field bridge arm and the second field bridge arm are connected in parallel to each other, the first field upper bridge arm and the second field upper bridge arm are both connected to a positive pole of the field direct current power supply, the first field lower bridge arm and the second field lower bridge arm are both connected to a negative pole of the field direct current power supply, the first field upper bridge arm, the first field lower bridge arm, the second field upper bridge arm and the second field lower bridge arm respectively include at least one field power switch tube, at least one diode connected in anti-parallel to the field power switch tube, and a field switch control end, each field power switch tube has one field control pole, the field switch control end is formed based on the field control pole, the field control signal includes n field unit control signals respectively corresponding to the n field chopper units and formed according to a field predetermined phase staggering rule, each field unit control signal includes four field switch control signals corresponding to the four field switch control ends in the corresponding field chopper unit, the field switch control end in the first field upper bridge arm is used as a first field upper bridge arm switch control end, the field switch control end in the first field lower bridge arm is used as a first field lower bridge arm switch control end, the field switch control end in the second field upper bridge arm is used as a second field upper bridge arm switch control end, and the field switch control end in the second field lower bridge arm is used as a second field lower bridge arm switch control end, for correspondingly receiving the four field switch control signals, the first field power output end is arranged between the first field upper bridge arm and the first field lower bridge arm, the second field power output end is arranged between the second field upper bridge arm and the second field lower bridge arm, the n first field power output ends of all the field chopper units and the n second field power output ends of all the field chopper units correspondingly form n pairs of field power output terminals, the separately excited direct current motor includes: m pairs of brushes; a stator including m pairs of main magnetic poles corresponding to the m pairs of brushes and one field winding portion; and a rotor, arranged in the stator and including a plurality of armature windings connected with one another in a predetermined connection manner, wherein each pair of main magnetic poles includes an S-polarity main magnetic pole and an N-polarity main magnetic pole, each pair of brushes includes an S-pole corresponding brush corresponding to the S-polarity main magnetic pole and an N-pole corresponding brush corresponding to the N-polarity main magnetic pole, the field winding portion includes n field winding units, each field winding unit is formed by field coils made from an insulated conductor bar composed of metal wires wrapped with an insulating layer on at least one pair of main magnetic poles, the insulated conductor bar in each field winding unit has one end and the other end, two leading-out ends of each pair of brushes respectively form a first armature terminal and a second armature terminal, the m first armature terminals and the m second armature terminals of all the brushes correspondingly form m pairs of armature external terminals, the m pairs of armature external terminals are connected to the m pairs of armature power output terminals in a one-to-to correspondence manner, the n one ends of all the insulated conductor bars form n first field terminals, the n other ends of all the insulated conductor bars form n second field terminals, the n first field terminals and the n second field terminals correspondingly form n pairs of field external terminals, the n pairs of field external terminals are connected to the n pairs of field power output terminals in a one-to-one correspondence manner, m is a positive integer not less than 2, n is a positive integer not less than 2, w is 1, 2 or 4, that is, each pair of armature external terminals is connected to a pair of brushes, and each pair of field external terminals is connected to one field winding unit. Therefore, on the one hand, the armature branch formed by each pair of brushes is independent from the field branch formed by each field winding unit, the armature branches and the field branches are independent of each other, the current of each branch is also independent, and each branch can work independently and is powered by a corresponding pair of power output terminals, that is: each pair of armature power output terminals only needs to bear the working current of one armature branch, which is only one m-th of the armature rated input current; and each pair of field power output terminals only bears the working current of one field branch, which is only one n-th of the field rated input current. For a motor with high rated input current, as long as m and n are large enough, the working current of each branch or the output current of each pair of power output terminals will be correspondingly decreased to reduce the power requirement of each chopper unit. Therefore, an ordinary power switch tube can meet the requirements of a high-power and high-performance motor, which not only reduces the costs of choppers, but also reduces the requirements of connecting wires and connectors between the power output terminals and the external terminals for contact resistance and insulation, reduces the difficulty of manufacturing, and helps to improve the reliability and safety of the system.

On the other hand, the armature control signal includes m armature unit control signals respectively corresponding to the m armature chopper units and formed according to a predetermined phase staggering rule, and the field control signal includes n field unit control signals respectively corresponding to the n field chopper units and formed according to a field predetermined phase staggering rule, so the phases of current ripples of each pair of armature power output ends or field power output terminals are different from each other, the ripple peak-to-peak value of the stacked current ripples of m armature currents or n field currents is decreased, the peak-to-peak values of ripples of the output torque and speed of the separately excited direct current motor are also decreased, and the performance and life of the separately excited direct current motor are improved.

Moreover, when the brushes, field winding units, and connecting wires in the motor fail, only the failure part needs to be shielded, and other normal parts can still work, which avoids the sudden out-of-control phenomenon of the conventional separately excited direct current motor in the event of failure and improves the reliability and safety of the system.

Based on the above, the separately excited direct current motor drive apparatus according to the first to third embodiments has the advantages of simple structure, short connecting wires, simple production process, easy manufacturing, convenient maintenance, low production and maintenance costs, reasonable and simple structural design, high reliability and safety, and the like, so that the first to third embodiments can not only be applied to heavy-duty electric equipment such as electric vehicles, electric pallets, rail cars, sightseeing vehicles, trucks and ships, but also can be applied to high-performance electric equipment such as numerically controlled machine tools and submarines.

<Variant>

In this variant, the same reference numerals are given to the same structures as those in FIG. 4, and the same descriptions are omitted.

Figure 15:
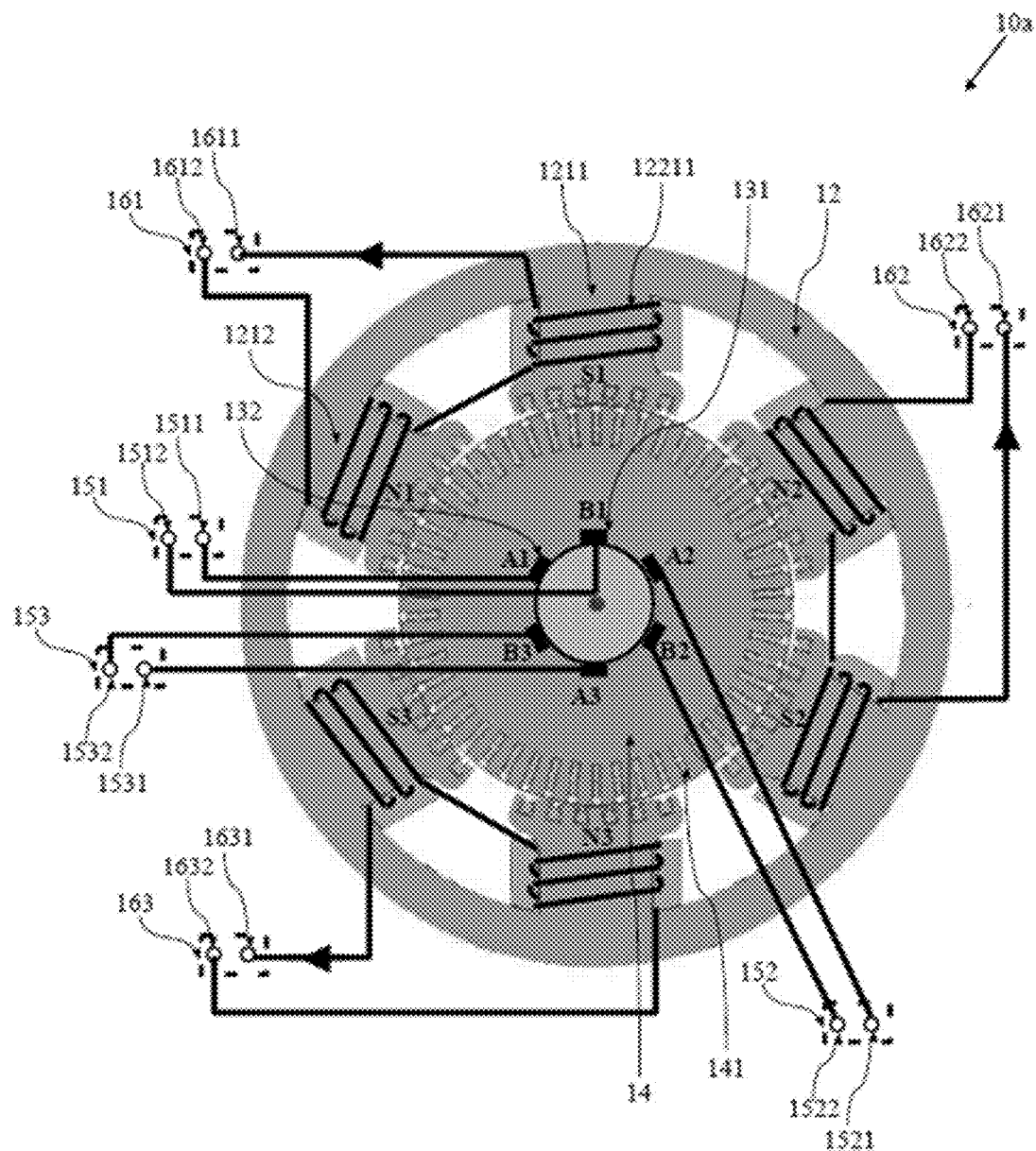
FIG. 15 is a transverse cross-sectional view of circuit connection of a separately excited direct current motor in a variant of the present invention.

As shown in FIG. 15, m=n=3, the three field winding units of the separately excited direct current motor 10a respectively correspond to the three pairs of main magnetic poles, and the insulated conductor bar in each field winding unit is formed on the corresponding pair of main magnetic poles. The number of turns of the field coil on each main magnetic pole is the same, each pair of main magnetic poles corresponds to the spatial position of the corresponding pair of brushes, the connection relationship of the two field coils in each field winding unit is any one of series and parallel, and the connection relationship of the two field coils in each field winding unit is the same.

The separately excited direct current motor 10a can replace the separately excited direct current motor 10 of the first to third embodiments, and has the functions and effects of the first to third embodiments, and when the motor fails and some units need to be shielded, because the magnetic field excited by the field winding unit of the non-failure part mainly acts on the armature winding branch connected by the corresponding brushes, the separately excited direct current motor can output a larger effective torque.

The foregoing embodiments are preferred cases of the present invention, and are not used to limit the protection scope of the present invention.

For example, when the armature current, speed, and torque of the separately excited direct current motor are required to have high precision during steady-state operation, m can also be set according to the peak-to-peak values and ripple factors of the corresponding armature current, speed, and torque ripples.

The invention claimed is:

1. A separately excited direct current motor drive apparatus, characterized by comprising:
    a separately excited direct current motor with a rated voltage;
    a direct current power supply with a constant voltage corresponding to the rated voltage;
    an armature chopper for converting the constant voltage into an armature variable voltage based on an armature control signal and providing the armature variable voltage to the separately excited direct current motor; and
    a field chopper for converting the constant voltage into a field variable voltage based on a field control signal and providing the field variable voltage to the separately excited direct current motor,
    wherein the armature chopper has m armature chopper units,
    each armature chopper unit has a first armature power output end, a second armature power output end and w armature switch control ends,
    the armature control signal comprises m armature unit control signals respectively corresponding to the m armature chopper units and formed according to a predetermined phase staggering rule,
    each armature unit control signal comprises w armature switch control signals corresponding to the w armature switch control ends in the corresponding armature chopper unit, the w armature switch control ends are used to correspondingly receive the w armature switch control signals, the m first armature power output ends of all the armature chopper units and the m second armature power output ends of all the armature chopper units correspondingly form m pairs of armature power output terminals, the field chopper has n field chopper units, each field chopper unit comprises a first field bridge arm and a second field bridge arm, as well as a first field power output end and a second field power output end, the first field bridge arm comprises a first field upper bridge arm and a first field lower bridge connected in series with each other, the second field bridge arm comprises a second field upper bridge arm and a second field lower bridge arm connected in series with each other, the first field bridge arm and the second field bridge arm are connected in parallel to each other, the first field upper bridge arm and the second field upper bridge arm are both connected to a positive pole of the field direct current power supply, the first field lower bridge arm and the second field lower bridge arm are both connected to a negative pole of the field direct current power supply, the first field upper bridge arm, the first field lower bridge arm, the second field upper bridge arm and the second field lower bridge arm respectively comprise at least one field power switch tube, at least one diode connected in anti-parallel to the field power switch tube, and a field switch control end, each field power switch tube has one field control pole, the field switch control end is formed based on the field control pole, the field control signal comprises n field unit control signals respectively corresponding to the n field chopper units and formed according to a field predetermined phase staggering rule, each field unit control signal comprises four field switch control signals corresponding to the four field switch control ends in the corresponding field chopper unit, the field switch control end in the first field upper bridge arm is used as a first field upper bridge arm switch control end, the field switch control end in the first field lower bridge arm is used as a first field lower bridge arm switch control end, the field switch control end in the second field upper bridge arm is used as a second field upper bridge arm switch control end, and the field switch control end in the second field lower bridge arm is used as a second field lower bridge arm switch control end, for correspondingly receiving the four field switch control signals, the first field power output end is arranged between the first field upper bridge arm and the first field lower bridge arm, the second field power output end is arranged between the second field upper bridge arm and the second field lower bridge arm, the n first field power output ends of all the field chopper units and the n second field power output ends of all the field chopper units correspondingly form n pairs of field power output terminals, the separately excited direct current motor comprises:

m pairs of brushes;

a stator, comprising m pairs of main magnetic poles corresponding to the m pairs of brushes and one field winding portion; and a rotor, arranged in the stator and comprising a plurality of armature windings connected with one another in a predetermined connection manner, each pair of main magnetic poles comprises an S-polarity main magnetic pole and an N-polarity main magnetic pole, each pair of brushes comprises an S-pole corresponding brush corresponding to the S-polarity main magnetic pole and an N-pole corresponding brush corresponding to the N-polarity main magnetic pole, the field winding portion comprises n field winding units, each field winding unit is formed by field coils made from an insulated conductor bar composed of metal wires wrapped with an insulating layer on at least one pair of main magnetic poles, the insulated conductor bar in each field winding unit has one end and the other end, two leading-out ends of each pair of brushes respectively form a first armature terminal and a second armature terminal, the m first armature terminals and the m second armature terminals of all the brushes correspondingly form m pairs of armature external terminals, the m pairs of armature external terminals are connected to the m pairs of armature power output terminals in a one-to-one correspondence manner, the n one ends of all the insulated conductor bars form n first field terminals, the n other ends of all the insulated conductor bars form n second field terminals, the n first field terminals and the n second field terminals correspondingly form n pairs of field external terminals, the n pairs of field external terminals are connected to the n pairs of field power output terminals in a one-to-one correspondence manner, m is a positive integer not less than 2, n is a positive integer not less than 2, and w is 1, 2 or 4.

2. The separately excited direct current motor drive apparatus according to claim 1, characterized in that:

wherein w is 1, each armature chopper unit comprises an armature upper bridge arm and an armature lower bridge arm, as well as a first armature power output end and a second armature power output end, the armature upper bridge arm and the armature lower bridge arm are connected in series with each other, the armature upper bridge arm is connected to the positive pole of the direct current power supply, the armature lower bridge arm is connected to the negative pole of the direct current power supply, the armature upper bridge arm comprises at least one armature power switch tube and an armature switch control end, each armature power switch tube has one armature control pole, the armature switch control end is formed based on the armature control pole, the armature control signal comprises m armature switch control signals respectively corresponding to the m armature chopper units and formed according to an armature predetermined phase staggering rule, the armature switch control end is used to correspondingly receive the armature switch control signals, the armature lower bridge arm comprises at least one diode, the first armature power output end is arranged between the armature upper bridge arm and the armature lower bridge arm, and the second armature power output end is arranged at an end, connected to the armature direct current power supply, of the armature lower bridge arm.

3. The separately excited direct current motor drive apparatus according to claim 2, characterized in that:
wherein the armature predetermined phase staggering rule is that phases of the m armature switch control signals are sequentially staggered by one m-th of a switching period; or,
m is an even number,
and the predetermined phase staggering rule is that the phases of the m armature switch control signals are sequentially staggered by two (m-th)s of a switching period.

4. Electric equipment, characterized by comprising:
a separately excited direct current motor drive apparatus,
wherein the separately excited direct current motor drive apparatus is the separately excited direct current motor drive apparatus according to claim 2.

5. The electric equipment according to claim 4, characterized in that:
wherein the electric equipment is any one of an electric forklift, an electric automobile, an electric sightseeing vehicle, an electric tractor, a large-scale machine tool spindle drive system and a ship.

6. The separately excited direct current motor drive apparatus according to claim 1, characterized in that:
wherein w is 2,
each armature chopper unit comprises an armature upper bridge arm and an armature lower bridge arm, as well as a first armature power output end and a second armature power output end,
the armature upper bridge arm and the armature lower bridge arm are connected in series with each other,
the armature upper bridge arm is connected to the positive pole of the armature direct current power supply, the armature lower bridge arm is connected to the negative pole of the armature direct current power supply,
the armature upper bridge arm and the armature lower bridge arm respectively comprise at least one armature power switch tube, at least one diode connected in anti-parallel to the armature power switch tube, and an armature switch control end,
each armature power switch tube has one armature control pole,
the armature switch control end is formed based on the armature control pole,
the armature control signal comprises m armature unit control signals respectively corresponding to the m armature chopper units and formed according to an armature predetermined phase staggering rule,
each armature unit control signal comprises two armature switch control signals corresponding to the two armature switch control ends in the corresponding armature chopper unit,
the armature switch control end in the armature upper bridge arm is used as an armature upper bridge arm switch control end, the armature switch control end in the armature lower bridge arm is used as an armature lower bridge arm switch control end, for correspondingly receiving the two armature switch control signals,
the first armature power output end is arranged between the armature upper bridge arm and the armature lower bridge arm, and the second armature power output end is arranged at an end, connected to the armature direct current power supply, of the armature lower bridge arm.

7. The separately excited direct current motor drive apparatus according to claim 6, characterized in that:
wherein in each armature chopper unit, the armature switch control signal corresponding to the armature upper bridge arm switch control end is set as an armature reference switch control signal, a phase of the armature reference switch control signal is determined according to the armature predetermined phase corresponding to the armature unit control signal, the armature switch control signal corresponding to the armature lower bridge arm switch control end is reciprocal to the armature reference switch control signal,
the armature predetermined phase staggering rule is that m phases respectively corresponding to the m armature unit control signals and used as m armature predetermined phases are sequentially staggered by one m-th of a switching period; or, m is an even number, and the armature predetermined phase staggering rule is that the m phases respectively corresponding to the m armature unit control signals and used as the m armature predetermined phases are sequentially staggered by two (m-th)s of a switching period.

8. The separately excited direct current motor drive apparatus according to claim 1, characterized in that:
wherein w is 4,
each armature chopper unit comprises a first armature bridge arm and a second armature bridge arm, as well as a first armature power output end and a second armature power output end,
the first armature bridge arm comprises a first armature upper bridge arm and a first armature lower bridge arm connected in series with each other, the second armature bridge arm comprises a second armature upper bridge arm and a second armature lower bridge arm connected in series with each other, the first armature bridge arm and the second armature bridge arm are connected in parallel to each other,
the first armature upper bridge arm and the second armature upper bridge arm are both connected to the positive pole of the armature direct current power supply, the first armature lower bridge arm and the second armature lower bridge arm are both connected to the negative pole of the armature direct current power supply,
the first armature upper bridge arm, the first armature lower bridge arm, the second armature upper bridge arm and the second armature lower bridge arm respectively comprise at least one armature power switch tube, at least one diode connected in anti-parallel to the armature power switch tube, and an armature switch control end,
each armature power switch tube has one armature control pole,
the armature switch control end is formed based on the armature control pole,
the armature control signal comprises m armature unit control signals respectively corresponding to the m armature chopper units and formed according to an armature predetermined phase staggering rule,
each armature unit control signal comprises four armature switch control signals corresponding to the four armature switch control ends in the corresponding armature chopper unit,
the armature switch control end in the first armature upper bridge arm is used as a first armature upper bridge arm switch control end, the armature switch control end in the first armature lower bridge arm is used as a first armature lower bridge arm switch control end, the armature switch control end in the second armature upper bridge arm is used as a second armature upper bridge arm switch control end, and the armature switch control end in the second armature lower bridge arm is used as a second armature lower bridge arm switch control end, for correspondingly receiving the four armature switch control signals, the first armature power output end is arranged between the first armature upper bridge arm and the first armature lower bridge arm, and the second armature power output end is arranged between the second armature upper bridge arm and the second armature lower bridge arm.

9. The separately excited direct current motor drive apparatus according to claim 8, characterized in that:

wherein in each armature chopper unit, the two armature switch control signals corresponding to the first armature upper bridge arm switch control end and the second armature lower bridge arm are set as armature reference switch control signals, phases of the armature reference switch control signals are determined according to the armature predetermined phase corresponding to the armature unit control signal, the armature switch control signals corresponding to the first armature lower bridge arm switch control end and the second armature upper bridge arm switch control end are reciprocal to the armature reference switch control signals, the armature predetermined phase staggering rule is that m phases respectively corresponding to the m armature unit control signals and used as m armature predetermined phases are sequentially staggered by one m-th of a switching period; or, m is an even number, and the armature predetermined phase staggering rule is that the m phases respectively corresponding to the m armature unit control signals and used as the m armature predetermined phases are sequentially staggered by two (m-th)s of a switching period.

10. The separately excited direct current motor drive apparatus according to claim 1, characterized in that:

wherein in each field chopper unit, the two field switch control signals corresponding to the first field upper bridge arm switch control end and the second field lower bridge arm are set as field reference switch control signals, phases of the field reference switch control signals are determined according to the field predetermined phase corresponding to the field unit control signal, the field switch control signals corresponding to the first field lower bridge arm switch control end and the second field upper bridge arm switch control end are reciprocal to the field reference switch control signals, the field predetermined phase staggering rule is that n phases respectively corresponding to the n field unit control signals and used as n field predetermined phases are sequentially staggered by one n-th of a switching period; or, n is an even number, and the field predetermined phase staggering rule is that the n phases respectively corresponding to the n field unit control signals and used as the n field predetermined phases are sequentially staggered by two (n-th)s of a switching period.

11. Electric equipment, characterized by comprising:
a separately excited direct current motor drive apparatus, wherein the separately excited direct current motor drive apparatus is the separately excited direct current motor drive apparatus according to claim 10.

12. The electric equipment according to claim 11, characterized in that:

wherein the electric equipment is any one of an electric forklift, an electric automobile, an electric sightseeing vehicle, an electric tractor, a large-scale machine tool spindle drive system and a ship.

13. The separately excited direct current motor drive apparatus according to claim 1, characterized in that:

wherein m=n, the n field winding units correspond to the m pairs of main magnetic poles respectively, the insulated conductor bar in each field winding unit is formed on the corresponding pair of main magnetic poles.

14. The separately excited direct current motor drive apparatus according to claim 13, characterized in that:

wherein the number of turns of the field coil on each main magnetic pole is the same, each pair of main magnetic poles corresponds to the spatial position of the corresponding pair of brushes, in each field winding unit, the connection relationship of the two field coils is any one of series and parallel, and the connection relationship of the two field coils in each field winding unit is the same.

15. The separately excited direct current motor drive apparatus according to claim 1, characterized in that:

wherein the insulated conductor bar in each field winding unit is formed on the m pairs of main magnetic poles.

16. The separately excited direct current motor drive apparatus according to claim 15, characterized in that:

wherein the winding direction and the number of turns of the n field coils on each main magnetic pole are the same, in each field winding unit, the connection relationship of the 2m field coils is any one of series, parallel and series-parallel, and the connection relationship of the 2m field coils in each field winding unit is the same.

17. The separately excited direct current motor drive apparatus according to claim 1, characterized in that:

wherein the predetermined connection manner is any one of single stack, cascade and complex wave.

18. Electric equipment, characterized by comprising:
a separately excited direct current motor drive apparatus,
wherein the separately excited direct current motor drive apparatus is the separately excited direct current motor drive apparatus according to claim 17.

19. The electric equipment according to claim 18, characterized in that:

wherein the electric equipment is any one of an electric forklift, an electric automobile, an electric sightseeing vehicle, an electric tractor, a large-scale machine tool spindle drive system and a ship.

20. Electric equipment, characterized by comprising:
a separately excited direct current motor drive apparatus,
wherein the separately excited direct current motor drive apparatus is the separately excited direct current motor drive apparatus according to claim 1.

* * * * *